(12) United States Patent
Nishio et al.

(10) Patent No.: US 8,596,893 B2
(45) Date of Patent: Dec. 3, 2013

(54) SHUTTER DEVICE

(75) Inventors: Tetsuya Nishio, Kawasaki (JP); Rentaro Imai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 13/302,759

(22) Filed: Nov. 22, 2011

(65) Prior Publication Data
US 2012/0128345 A1    May 24, 2012

(30) Foreign Application Priority Data

Nov. 24, 2010 (JP) ................................. 2010-261599
Nov. 24, 2010 (JP) ................................. 2010-261601

(51) Int. Cl.
*G03B 9/08* (2006.01)
(52) U.S. Cl.
USPC ........................... 396/443; 396/465; 396/470
(58) Field of Classification Search
USPC ......................... 396/443, 465, 466, 470, 489
See application file for complete search history.

(56) References Cited

U.S. PATENT DOCUMENTS

| | | | |
|---|---|---|---|
| 6,071,019 A * | 6/2000 | Shimada ....................... | 396/456 |
| 2006/0198631 A1* | 9/2006 | Yamagami ..................... | 396/443 |
| 2010/0027987 A1* | 2/2010 | Tanaka et al. ................ | 396/465 |
| 2012/0128343 A1* | 5/2012 | Niwamae ...................... | 396/357 |
| 2012/0128345 A1* | 5/2012 | Nishio et al. ................. | 396/493 |
| 2012/0128346 A1* | 5/2012 | Matsumoto ................... | 396/493 |

FOREIGN PATENT DOCUMENTS

JP        3542192 B2    7/2004
JP    2008-180815 A    8/2008

* cited by examiner

*Primary Examiner* — WB Perkey
(74) *Attorney, Agent, or Firm* — Canon USA Inc IP Division

(57) ABSTRACT

When a blade drive spring has been overcharged when a second cam gear has caused a drive lever to move to a position beyond a position of attraction of an armature by a yoke, a blade lever does not contact the drive lever even if the blade lever has been driven in a direction of opening an aperture by a first blade and a second blade with an urging force of a blade return spring. When the second cam gear has moved to the attraction position form the overcharged position, the blade lever contacts the drive lever before the yoke starts attracting the armature by the attractive force.

7 Claims, 20 Drawing Sheets

SECTION A-A

SECTION B

SHUTTER DEVICE

BACKGROUND OF THE INVENTION

1. Field of the Invention

The present invention relates to a shutter device.

2. Description of the Related Art

Japanese Patent Application Laid-Open No. 2008-180815 discusses an imaging apparatus that uses a focal plane shutter and an electronic shutter in combination with each other to execute an imaging operation. The conventional imaging apparatus starts an exposure operation by using an electronic shutter function of an image sensor. In addition, the conventional imaging apparatus controls a blade group constituted by a mechanical shutter to end an exposure operation.

In the above-described conventional imaging apparatus, after locking a drive lever by energizing an electromagnet, a set lever starts driving a mirror in a mirror-up direction. After the mirror-up operation, a blade lever is unlocked and an aperture formed by a blade group is opened. Subsequently, when the energization of the electromagnet is discontinued at a predetermined timing, the drive lever and the blade lever are driven simultaneously in a direction of closing the aperture.

In the focal plane shutter discussed in Japanese Patent Application Laid-Open No. 2008-180815, when the blade lever is unlocked to open the aperture by the blade group, the blade lever collides with the locked drive lever when the electromagnet is energized.

When the drive lever is locked by energizing the electromagnet, the drive lever is locked by attracting an armature with a yoke. If the blade lever collides with the drive lever in this state, attraction surfaces of the yoke and the armature may be damaged. If the attraction surfaces of the yoke and the armature are damaged, the attracting performance and the separation performance may degrade. As a result, the accuracy of the operation of the shutter device may degrade.

Alternatively, the drive lever and the blade lever may be driven by a mutually integrated operation after the drive lever has collided with the blade lever during the travel of shutter blades in the direction of closing an aperture. In this case, however, the pivot speed of the drive lever may vary due to the impact from the collision. As a result, the speed of travel of the shutter blades may vary. In this case also, the accuracy of the operation of the shutter device may degrade.

SUMMARY OF THE INVENTION

According to an aspect of the present invention, a shutter device includes a shutter blade configured to close and open an aperture, a blade lever connected with the shutter blade, a blade return spring configured to urge the blade lever in a direction in which the aperture is opened by the shutter blade, a drive lever configured to press the blade lever in a direction in which the aperture is closed by the shutter blade, a blade drive spring configured to urge the drive lever in a direction in which the aperture is closed by the shutter blade, an armature associated with the drive lever, a yoke configured to attract the armature when energized by an attractive force, a first member configured to lock the blade lever to cause the shutter blade to shift to a state of closing the aperture, and a second member configured to charge the blade drive spring by moving the drive lever, wherein, when the second member has moved that the drive lever to move to an overcharged position beyond an attraction position of the armature by the yoke, the blade drive spring has been overcharged and the blade lever is configured not to contact the drive lever even if the blade lever is driven in a direction of opening the aperture by the shutter blade, wherein, when the second member has moved to the attraction position form the overcharged position, the blade lever is configured to contact the drive lever before the yoke starts attracting the armature by the attractive force.

According to an exemplary embodiment of the present invention, a shutter device can be provided that is capable of preventing the speed of travel of shutter blades from varying without damaging attraction surfaces of a yoke and an armature.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

DESCRIPTION OF THE EMBODIMENTS

Various exemplary embodiments, features, and aspects of the invention will be described in detail below with reference to the drawings.

Now, a shutter device, which implements the present invention, and an imaging apparatus equipped with the shutter device, will be described in detail below with reference to FIGS. 1A, 1B, and 20.

Figure 20:
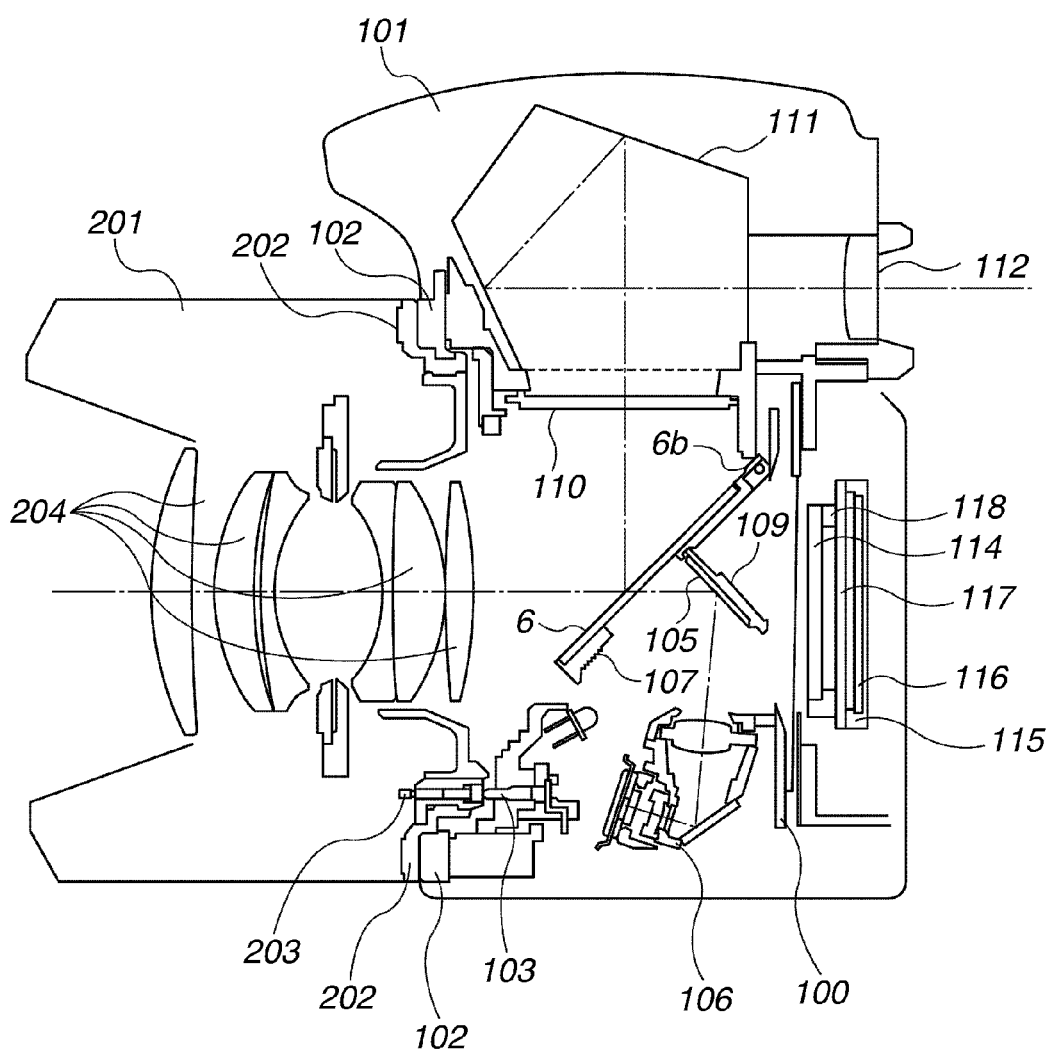
FIG. 20 is a central-plane cross section of a digital single-lens reflex camera body, which is an imaging apparatus according to an exemplary embodiment of the present invention, and an interchangeable lens.

FIG. 20 is a central-plane cross section of a digital single-lens reflex camera body 101, which is an imaging apparatus according to an exemplary embodiment of the present invention, and an interchangeable lens 201.

The interchangeable lens 201, which can be detachably attached to the camera body 101, is fixed by a camera mounting portion 102 and a lens mounting portion 202. When the interchangeable lens 201 is mounted, the contact portion 103 of the camera body 101 and the contact portion 203 of the interchangeable lens 201 are electrically connected with each other. At this timing, the camera body 101 detects that the interchangeable lens 201 has been mounted. In addition, the camera body 101 supplies power to the interchangeable lens 201 via the contact portions 103 and 203 and communicates with the interchangeable lens 201 to control the interchangeable lens 201.

A light flux that has travelled through a focus lens 204 of the interchangeable lens 201 is incident to a main mirror 6 of the camera main body 101. The main mirror 6 can advance and retract into and from a photographic optical path. The main mirror 6 is a half mirror. The light flux reflected on the main mirror 6 is guided to a viewfinder. In addition, the light flux that has reflected from the main mirror 6 is further reflected downwards by a sub mirror 105 to be guided to a focus detection unit 106.

The focus detection unit 106 detects an amount of defocus in the focus lens 204. In addition, the focus detection unit 106 calculates a lens drive amount for moving the focus lens 204 to achieve an in-focus state of the focus lens 204. When the calculated lens drive amount is transmitted to the interchangeable lens 201 via the contact portions 103 and 203, the interchangeable lens 201 controls a motor (not illustrated) to move the focus lens 204 and executes focusing.

The main mirror 6 is supported by a main mirror supporting frame 107. More specifically, the main mirror 6 is pivotably supported by a rotation shaft portion 6b. In addition, the sub mirror 105 is supported by a sub mirror supporting frame 109. The sub mirror supporting frame 109 is pivotably supported by a hinge shaft (not illustrated) and can pivot around the main mirror supporting frame 107.

The light flux guided to the viewfinder forms an object image on a focusing screen 110. A user can observe the object image on the focusing screen 110 via a pentagonal prism 111 and an eyepiece lens 112.

A shutter unit 100 is provided behind the sub mirror 105. In an initial state, a blade group is closed. An optical low-pass filter 114 is provided behind the shutter unit 100.

An image sensor 116 and a cover member 117 are provided behind the optical low-pass filter 114. The image sensor 116 is supported by an image sensor holder 115, which is fixed to a housing by a screw (not illustrated). The cover member 117 protects the image sensor 116.

A rubber member 118 supports the optical low-pass filter 114 and functions as a close seal between the optical low-pass filter 114 and the image sensor 116. During shooting, a light flux that has passed through the optical low-pass filter 114 is incident to the image sensor 116.

Figure 1A:
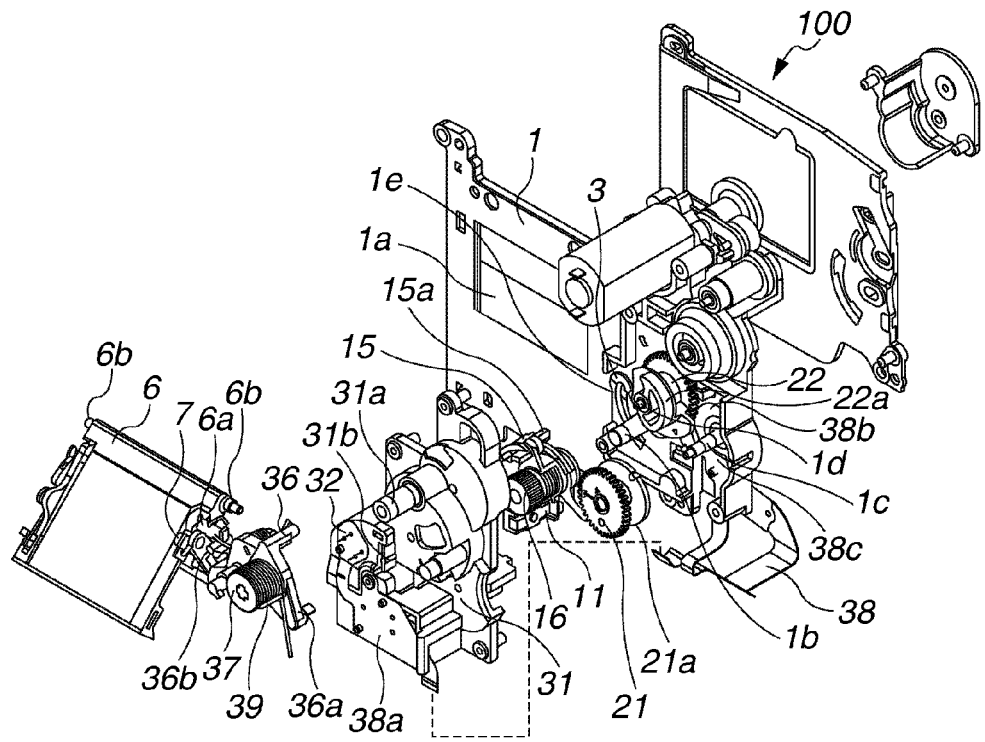
FIGS. 1A and 1B are exploded perspective views of a shutter unit.

FIG. 1A is an exploded perspective view of the shutter unit 100 viewed from the front. FIG. 1B is an exploded perspective view of the shutter unit 100 viewed from the back side thereof. Referring to FIG. 1A, an aperture 1a is formed in the center of a shutter base plate 1. Shafts 1b through 1d are formed on the shutter base plate 1.

A drive lever 11, a blade lever 15, and a ratchet 16 are pivotably supported by the shaft 1b. A first cam gear 21 is rotatably supported by the shaft 1c. A second cam gear 22 is rotatably supported by the shaft 1d. The first cam gear 21 functions as a first member. The second cam gear 22 functions as a second member.

The drive lever 11 and the ratchet 16 are pivotably supported around the shaft 1b. The first cam gear 21 is pivotably supported around the shaft 1c. The second cam gear 22 is pivotably supported around the shaft 1d. An auxiliary base plate 31 is fixed onto the shutter base plate 1.

The blade lever 15, which is pivotably supported by the drive lever 11, pivots around the shaft 1b similar to the drive lever 11. Shaft bearing holes, into which the shafts 1b through 1d are inserted, are given to the auxiliary base plate 31. The drive lever 11, the blade lever 15, the ratchet 16, the first cam gear 21, and the second cam gear 22 are sandwiched between the shutter base plate 1 and the auxiliary base plate 31.

A shaft 31a is formed on the auxiliary base plate 31. A mirror lever 36 is freely and pivotably supported around the shaft 31a. A mirror lever drive spring 39 is latched on the mirror lever 36. The mirror lever drive spring 39 is urged in a clockwise direction in FIG. 1 (i.e., in a direction of ascending the main mirror 6). The main mirror 6 oscillatingly pivots around the rotation shaft portion 6b.

With the above-described configuration, the main mirror 6 can be moved between a mirror-down position and a mirror-up position. The mirror-down position is a position at which the main mirror 6 remains stationary at an angle of 45° against a photographic optical axis to guide an imaging light flux towards the pentagonal prism 111. On the other hand, the mirror-up position is a position at which the main mirror 6 is kept stationary at a position to which the main mirror 6 is retracted from the imaging light flux to guide the light flux towards the image sensor 116.

A main mirror drive spring 7 is latched onto a shaft portion 6a of the main mirror 6. The main mirror drive spring 7 presses the main mirror 6 in a mirror-down direction. Ratchet teeth 16a are formed on the ratchet 16. An engaging claw portion 31b, which is an engaging member for engaging with the ratchet tooth 16a, is provided to the auxiliary base plate 31. A photosensor 32, which detects a pivoting position of the blade lever 15, is mounted on the auxiliary base plate 31.

Figure 1B:
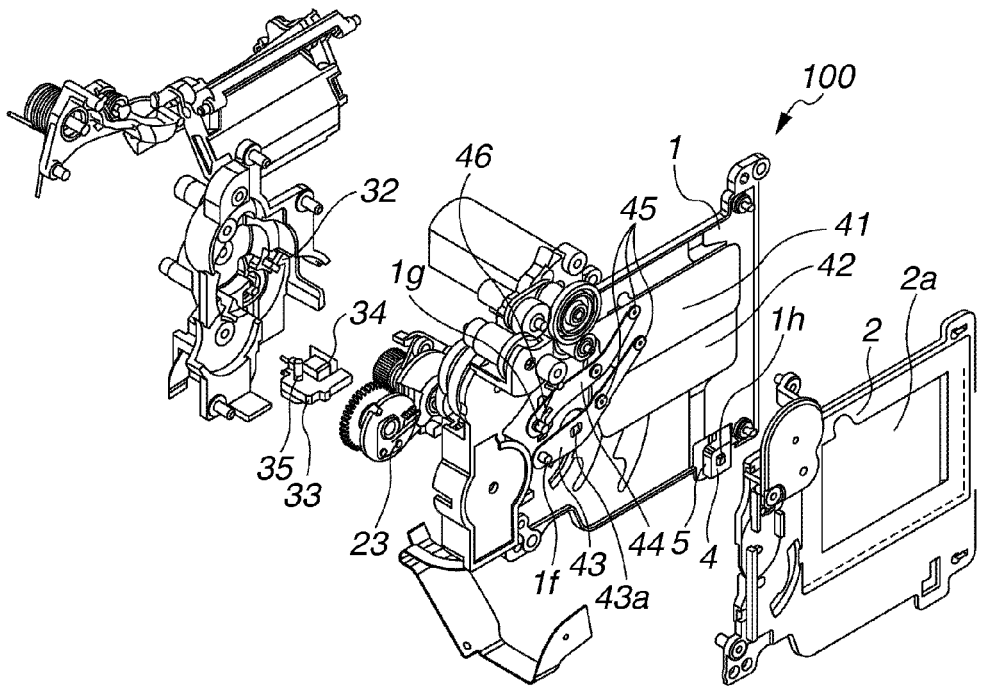

Referring to FIG. 1B, a yoke 33 and a coil 34 are fixed by the screw 35 to the auxiliary base plate 31. By applying a voltage to the coil 34, a magnetic force is generated on the yoke 33. As illustrated in FIG. 1A, a first fixing portion 38a and a second fixing portion 38b are formed on a flexible printed circuit (FPC) 38. The auxiliary base plate 31 is fixed to the flexible printed circuit 38 at the first fixing portion 38a. The shutter base plate 1 is fixed to the flexible printed circuit 38 at the second fixing portion 38b.

The flexible printed circuit 38 is connected with the coil 34 and the photosensor 32 via the first fixing portion 38a. A phase pattern portion 38c is formed on the second fixing portion 38b of the flexible printed circuit 38. The phase pattern portion 38c detects the phase of a phase armature 23, which is mounted to the first cam gear 21.

A semicircular cushioning member 3 is fixed on top of an arc-shaped perforation 1e, which is formed on the shutter base plate 1. The semicircular cushioning member 3 is made of an elastic material, such as rubber.

As illustrated in FIG. 1B, a cover plate 2 is fixed on a back surface of the shutter base plate 1. An aperture 2a is formed in the center of the cover plate 2 at a position substantially identical with the position of the aperture 1a of the shutter base plate 1. The apertures 1a and 2a restrict a light flux going through the shutter unit 100.

A blade chamber, in which the blade group is provided, is formed between the shutter base plate 1 and the cover plate 2. The blade group is constituted by a first blade 41, a second blade 42, a main arm 43, and a sub arm 44.

The first blade 41 and the second blade 42, which are shutter blades, are made of polyethylene terephthalate (PET) that contains a blackening. The first blade 41 and the second blade 42 are pivotably supported by the main arm 43 and the sub arm 44 by using a pin 45.

The main arm 43 is pivotably supported around a shaft 1f, which is provided on the shutter base plate 1. The sub arm 44 is pivotably supported around a shaft 1g, which is provided on the shutter base plate 1.

The main arm 43 turns around the shaft 1f. The sub arm 44 turns around the shaft 1g. Accordingly, the first blade 41 and the second blade 42 execute a parallel link action. A hole 43a, which is a hole for engaging the main arm 43 with an engaging portion 15a of the blade lever 15, which will be described below, is formed on the main arm 43.

The blade lever 15 functions as a blade lever connected with the first blade 41 and the second blade 42. A blade return spring 46 is latched on the sub arm 44. The blade return spring 46 presses the sub arm 44 in the clockwise direction in FIG. 1B.

More specifically, with the pressure force from the blade return spring 46, the first blade 41 and the second blade 42 travel in the direction of opening the apertures 1a and 2a. Furthermore, after the first blade 41 and the second blade 42 have completely travelled in the direction of opening the apertures 1a and 2a with the urging force from the blade return spring 46, the first blade 41 and the second blade 42 collide with a blade cushioning member 4.

The blade cushioning member 4 is fixed to a shaft portion 1h, which has a rectangular shape and which is provided on the shutter base plate 1. The blade cushioning member 4 has a rectangular outer shape. The shaft portion 1h has the same rectangular outer shape as the outer shape of the blade cushioning member 4. More specifically, when the blade cushioning member 4 is mounted on the shutter base plate 1, sides of the outer shape of the blade cushioning member 4 and sides of the shaft portion 1h are substantially parallel to one another.

In the present exemplary embodiment, the blade cushioning member 4 and the shaft portion 1h have the rectangular shape. However, the blade cushioning member 4 and the shaft portion 1h can have a polygonal shape different from the rectangular shape if the polygonal shape satisfies the above-described condition.

The blade cushioning member 4 is made of a rubber material, such as chloroprene rubber, butyl rubber, polyurethane rubber, or silicon rubber, or a material that can absorb an impact, such as an elastomer. The blade cushioning member 4 is surrounded by and covered with a blade contact member 5. The blade contact member 5 is made of a material having a wear resistance higher than the wear resistance of the blade cushioning member 4. More specifically, the blade contact member 5 is made of a metal material or a plastic material. The blade contact member 5 is fixed on the blade cushioning member 4.

When the first blade 41 and the second blade 42 are moved in a direction of coming into collision with the blade cushioning member 4, the first blade 41 and the second blade 42 are configured not to directly contact the blade cushioning member 4. With the above-described configuration, abrasion of the blade cushioning member 4, which may otherwise occur if the first blade 41 and the second blade 42 collide with the blade cushioning member 4, is prevented.

Figure 2A:
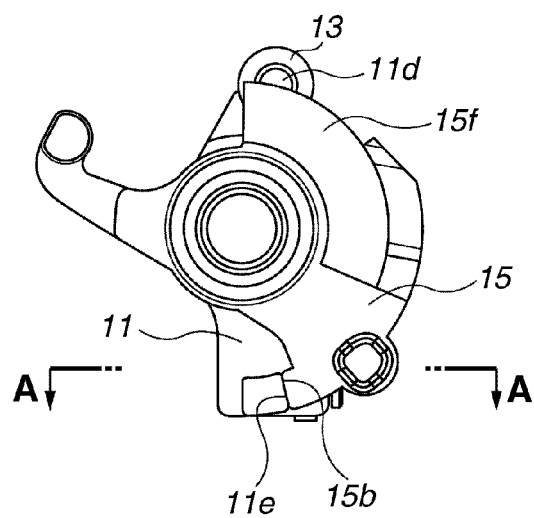
FIGS. 2A through 2D illustrate a drive lever, a blade lever, and a ratchet.
Figure 2B:
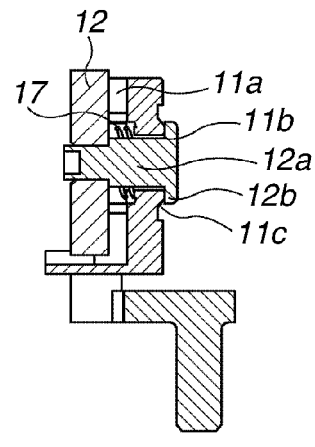
Figure 2C:
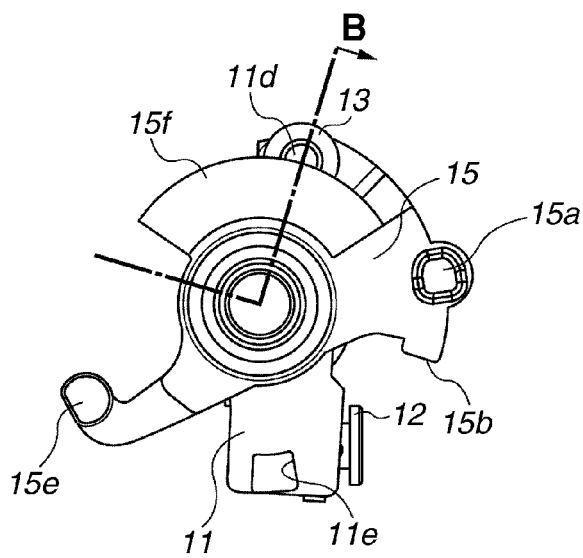
Figure 2D:
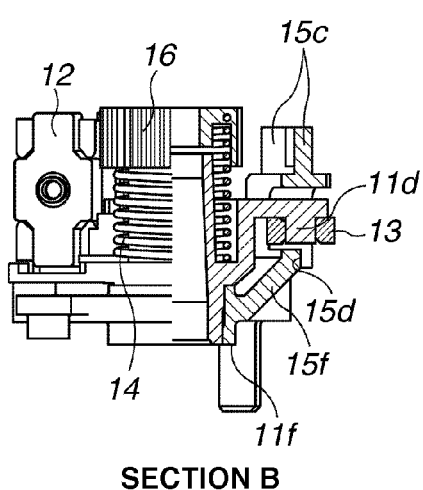

FIGS. 2A through 2D illustrate the drive lever 11, the blade lever 15, and the ratchet 16. FIGS. 2A and 2C illustrate the drive lever 11, the blade lever 15, and the ratchet 16 viewed from the shutter base plate 1. FIG. 2B is a section A-A in FIG. 2A. More specifically, FIG. 2B is a cross section of an armature supporting portion 11a of the drive lever 11. FIG. 2D is a section B-B in FIG. 2C. More specifically, FIG. 2D illustrates an exemplary relationship between a roller supporting shaft 11d of the drive lever 11 and a roller bearing portion 15d of the blade lever 15.

Referring to FIGS. 2A and 2C, a projection portion 11e is formed on the drive lever 11. On the other hand, a projection portion 15b is formed on the blade lever 15. In the state illustrated in FIG. 2A, the projection portion 11e contacts the projection portion 15b. In the state illustrated in FIG. 2C, the projection portion 11e does not contact the projection portion 15b.

Referring to FIG. 2B, the armature supporting portion 11a is provided to the drive lever 11. A through-hole 11b is formed through the armature supporting portion 11a. On one end of an armature shaft 12a, a flange 12b, whose dimension is greater than the inner diameter of the through-hole 11b, is formed.

The other end of the armature shaft 12a is loosely inserted to the through-hole 11b. After having attached the armature 12 to the armature shaft 12a, the other end of the armature shaft 12a is swaged.

An armature spring 17, which is a compression spring, is provided around the armature shaft 12a and between the armature 12 and the armature bearing portion 11a. The armature spring 17 applies an urging force in the direction of separating the armature 12 from the armature supporting portion 11a. A hemisphere-shaped protrusion 11c is formed on the armature supporting portion 11a at a position opposite the flange 12b.

As illustrated in FIGS. 2A, 2C, and 2D, a roller 13 is pivotably supported around the roller supporting shaft 11d of the drive lever 11. Lubricating oil is applied between the roller supporting shaft 11d and the roller 13. The roller 13 contacts a second cam surface 22c of the second cam gear 22.

The projection portion 11e is provided to the drive lever 11. The projection portion 11e contacts the projection portion 15b of the blade lever 15. The engaging portion 15a, which protrudes from the blade lever 15, is provided to the blade lever 15. The engaging portion 15a extends through an arc-shaped perforation 1e of the shutter base plate 1. In addition, the engaging portion 15a engages into a hole 43a of the main arm 43 on the back surface of the shutter base plate 1.

Accordingly, the main arm 43 pivots in interlock with the pivoting of the blade lever 15. A cam follower 15e is provided to the blade lever 15. The cam follower 15e contacts a cam surface 21b of the first cam gear 21.

Two light shielding walls 15c are provided to the blade lever 15. The light shielding walls 15c shields the photo sensor 32 from light. The photo sensor 32 detects a pivoting position of the blade lever 15. In other words, the photo sensor 32 functions as a detection unit and the light shielding walls 15c functions as a detection object portion.

The roller bearing portion 15d is provided to the blade lever 15. In order to prevent falling off of the roller 13 from the roller supporting shaft 11d, the roller bearing portion 15d extends towards the roller supporting shaft 11d. The roller bearing portion 15d is formed in a range in which the roller supporting shaft 11d moves during driving of the blade lever 15 in the direction of opening of the apertures 1a and 2a by the first blade 41 and the second blade 42 with the urging force from the blade return spring 46.

More specifically, regardless of the positional relationship between the drive lever 11 and the blade lever 15, the roller bearing portion 15d is located opposite the roller supporting shaft 11d. Accordingly, even if the lubricating oil applied between the roller supporting shaft 11d and the roller 13 has spread, the spread oil may only adhere to the roller bearing portion 15d and would not spread over to the shutter base plate 1.

Referring to FIG. 2D, a cylinder portion 11f of the drive lever 11 fits on the shaft 1b of the shutter base plate 1. Accordingly, the drive lever 11 is pivotably supported around the shaft 1b of the shutter base plate 1. Furthermore, the blade lever 15 fits in the cylinder portion 11f of the drive lever 11. Accordingly, the blade lever 15 is pivotably supported around the cylinder portion 11f of the drive lever 11.

With the above-described configuration, the blade lever 15 pivots in relation to the shutter base plate 1, and the drive lever 11 pivots in relation to the shutter base plate 1 around the same shaft as the pivoting operation of the blade lever 15.

As illustrated in FIG. 2D, a blade drive spring 14, which is a torsion spring, is provided between the ratchet 16 and the drive lever 11. One end 14a of the blade drive spring 14 is retained by the drive lever 11. The other end 14b of the blade drive spring 14 is retained by the ratchet 16.

In FIG. 2A, the blade drive spring 14 presses the drive lever 11 in the counterclockwise direction. The free length of the blade drive spring 14 is designed to be longer than the interval between the drive lever 11 and the ratchet 16. The blade drive spring 14 functions as a pressure spring. Furthermore, the blade drive spring 14 urges the blade drive spring 14 against the shutter base plate 1.

As illustrated in FIG. 2D, a slope 15f is provided to the blade lever 15. With the slope 15f, the roller bearing portion 15d of the blade lever 15 extends away from the pivot center of the blade lever 15 in a substantially conic shape. If the slope 15f is otherwise provided to extend away from the pivot center of the blade lever 15 in a substantially cylindrical shape, the inertial force applied on the blade lever 15 when the blade lever 15 pivots may become excessively great.

To prevent the above-described problem of an excessively great inertial force applied to the blade lever 15, in the present exemplary embodiment, the roller bearing portion 15d is designed to have a substantially conic shape. Accordingly, the roller bearing portion 15d can be provided while preventing a very great inertial force on the blade lever 15.

The drive lever 11 is assembled to the blade lever 15 in the following manner. First, the roller 13 is inserted into the roller supporting shaft 11d. Subsequently, the blade lever 15 is inserted into the cylinder portion 11f in the state illustrated in FIG. 2A. Then the blade lever 15 is turned in the counterclockwise direction in relation to the drive lever 11, the relationship between the blade lever 15 and the drive lever 11 becomes the state illustrated in FIG. 2C.

In the state illustrated in FIG. 2C, the roller supporting shaft 11d is located between the roller bearing portion 15d and the light shielding walls 15c. Accordingly, falling off of the drive lever 11 from the blade lever 15 is always prevented.

In addition, the dimension of the range in which the roller supporting shaft 11d moves between the roller bearing portion 15d and the light shielding wall 15c is smaller than the thickness of the roller 13. Accordingly, falling off of the roller 13 from the roller supporting shaft 11d is always prevented.

As described above, in the state in which the drive lever 11, the roller 13, and the blade lever 15 are integrally operated, the cylinder portion 11f of the drive lever 11 is fitted on the shaft 1b of the shutter base plate 1.

Figure 3:
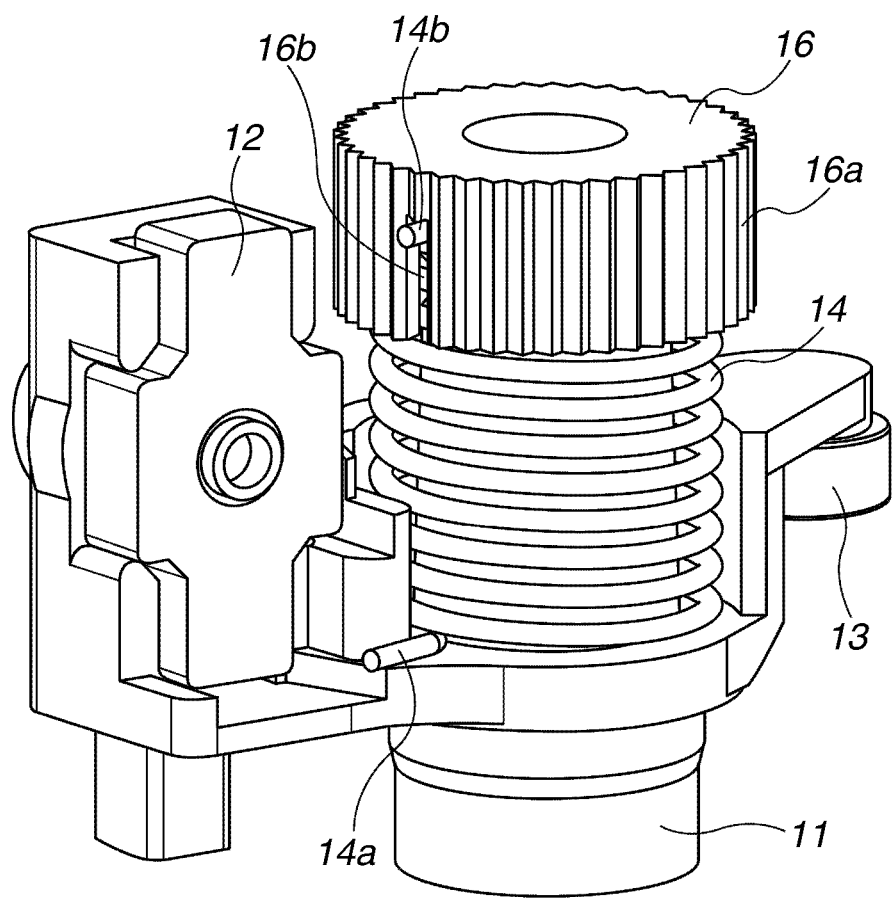
FIG. 3 illustrates a state in which a blade drive spring and the ratchet are assembled to the drive lever.

FIG. 3 illustrates a state in which the blade drive spring 14 and the ratchet 16 are assembled to the drive lever 11. Referring to FIG. 3, one end 14a of the blade drive spring 14 is retained by the drive lever 11 and the other end 14b of the blade drive spring 14 engages a slit 16b, which is provided to the ratchet 16.

In the state illustrated in FIG. 3, the blade drive spring 14 is in a "free" state, in which the blade drive spring 14 has not been charged. When the ratchet 16 is turned in the clockwise direction, the blade drive spring 14 is charged. In the state in which the ratchet 16 is turned to charge the blade drive spring 14, the engaging claw portion 31b, which is provided to the auxiliary base plate 31, engages the ratchet tooth 16a.

The urging force from the blade drive spring 14 against the drive lever 11 is adjusted by adjusting the turning amount of the ratchet 16. In other words, the ratchet 16 is equivalent to a ratchet member.

Figure 4A:
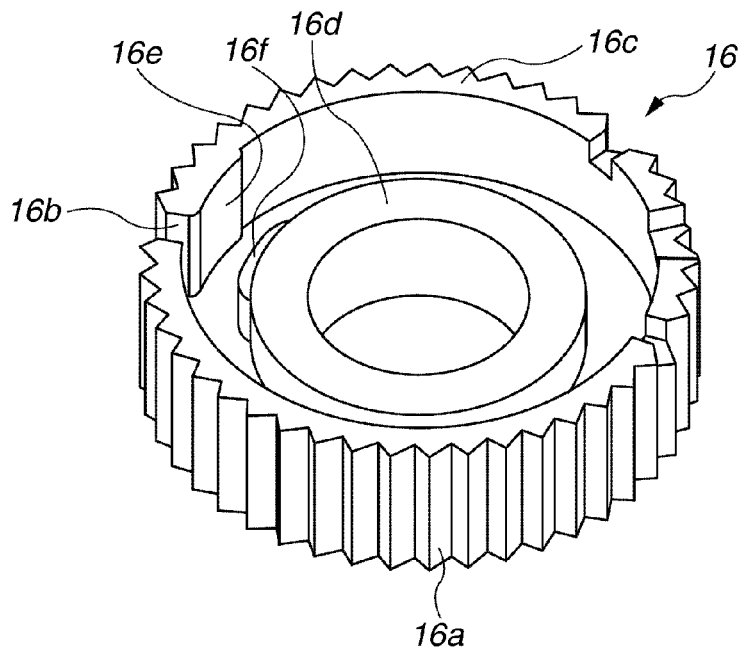
FIGS. 4A through 4C illustrate the ratchet.
Figure 4B:
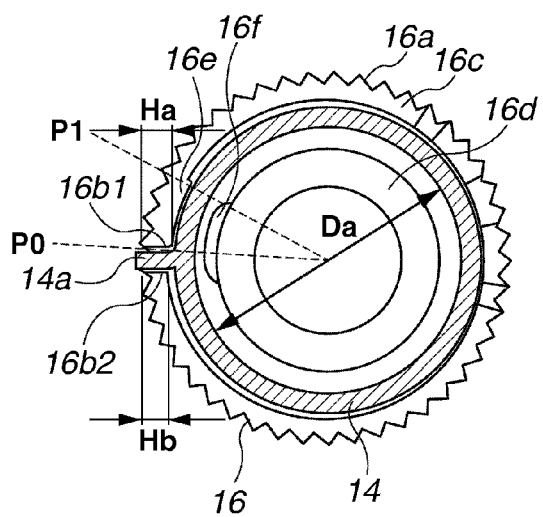
Figure 4C:
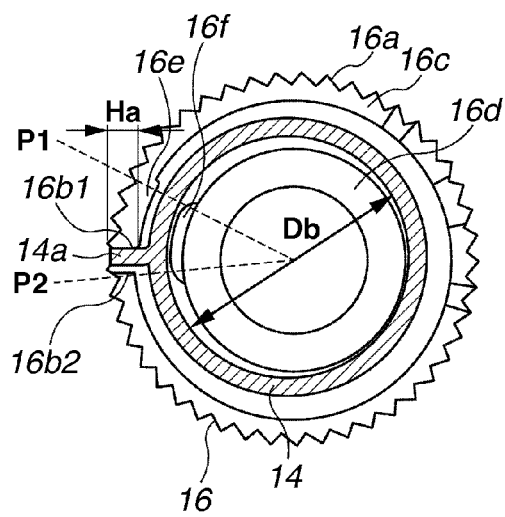

FIGS. 4A through 4C illustrate the ratchet 16. FIG. 4A illustrates an outer appearance of the ratchet 16. Referring to FIG. 4A, the ratchet 16 has a duplex cylinder-shape formed by a first cylinder portion 16c and a second cylinder portion 16d.

The ratchet teeth 16a are provided to the outer circumferential surface of the first cylinder portion 16c. The second cylinder portion 16d, which is a cylindrical portion concentric with the first cylinder portion 16c, is provided inside the first cylinder portion 16c. The slit 16b is provided to the first cylinder portion 16c as a notch that is cut at a part of the first cylinder portion 16c.

At an end of the slit 16b, a projection portion 16e, which protrudes from the inner peripheral surface of the first cylinder portion 16c towards the second cylinder portion 16d, is provided. Accordingly, the portion at which the projection portion 16e is formed has a thickness thicker than the other portion of the first cylinder portion 16c in the direction of the diameter of the first cylinder portion 16c.

A protrusion 16f, which protrudes towards the first cylinder portion 16c, is provided in a portion of the second cylinder portion 16d on the outer peripheral surface thereof in which the slit 16b and the projection portion 16e are located opposite each other.

FIG. 4B illustrates a state in which the blade drive spring 14 is provided between the first cylinder portion 16c and the second cylinder portion 16d and the other end 14b of the blade drive spring 14 engages the slit 16b.

In the state illustrated in FIG. 4B, the blade drive spring 14 is in the free state, in which the blade drive spring 14 has not been charged.

Referring to FIG. 4B, in a range of a first angular position P1 of an end 16b1 of the slit 16b from a position of the end 16b1 in the clockwise direction, the projection portion 16e, which protrudes from the inner peripheral surface of the first cylinder portion 16c towards the second cylinder portion 16d, is formed. More specifically, the projection portion 16e is formed in the range in which the end 16b1 is located at the first angular position P1 in a direction opposite the direction of charging the blade drive spring 14, from the end 16b1 of the slit 16b, with which the other end 14b of the blade drive spring 14 contacts, in turning the ratchet 16 in the direction of charging the blade drive spring 14.

A thickness Ha of the edge 16b1 of the slit 16b is thicker than a thickness Hb of an edge 16b2 of the slit 16b. The end 16b1 of the slit 16b is equivalent to one end of the slit 16b and the edge 16b2 of the slit 16b is equivalent to the other end of the slit 16b. The slit 16b is formed so that the end 16b1 of the slit 16b becomes a tip of the ratchet tooth 16a. With the above-described configuration, the area of the end 16b1 of the slit 16b can become as large as possible.

When the ratchet 16 is turned in the counterclockwise direction from the state illustrated in FIG. 4B, one end 14a of the blade drive spring 14 contacts the end 16b1 of the slit 16b. In this state, the blade drive spring 14 is charged. When the blade drive spring 14 is charged, the state of the blade drive spring 14 becomes the state illustrated in FIG. 4C.

When the blade drive spring 14 is charged, a force acts on the end 16b1 of the slit 16b. Although the ratchet 16 is made of a resin material, the end 16b1 of the slit 16b has a sufficient strength due to the projection portion 16e formed thereto. Accordingly, in charging the blade drive spring 14, one end 14a of the blade drive spring 14 may never be pressed into the end 16b1 of the slit 16b.

Referring to FIG. 4C, when the blade drive spring 14 is charged, the blade drive spring 14 is squeezed to be in a tensioned state. In this state, the diameter of the blade drive spring 14 varies from a diameter Da (FIG. 4B) to a diameter Db (FIG. 4C).

When the diameter of the blade drive spring 14 becomes smaller, the range of the contact between one end 14a of the blade drive spring 14 and the end 16b1 of the slit 16b may become smaller. If one end 14a of the blade drive spring 14 is designed to be long to prevent the above-described problem, if the amount of charge on the blade drive spring 14 is not large, one end 14a of the blade drive spring 14 may be projected from the slit 16b.

In this case, the total size of the shutter device cannot be effectively reduced because no part can be provided in a space in which one end 14a of the blade drive spring 14 may be projected. In order to prevent the above-described problem, in the present exemplary embodiment, a projection portion 16f, which protrudes towards the first cylinder portion 16c, is provided to the outer peripheral surface of the second cylinder portion 16d in a range in which the projection portion 16e is formed and located at the first angular position P1 from a position P2 of the other end 16b2 of the slit 16b.

The blade drive spring 14 is charged in the above-described manner. Even if the diameter of the blade drive spring 14 has become the diameter Db illustrated in FIG. 4C, the range of contact between one end 14a of the blade drive spring 14 and the end 16b1 of the slit 16b can be secured.

Accordingly, the problem of one end 14a of the blade drive spring 14 being pressed into the end 16b1 of the slit 16b, which may otherwise occur if the range of contact between one end 14a of the blade drive spring 14 and the end 16b1 of the slit 16b becomes small, may never arise. In addition, it is not necessary to provide long one end 14a of the blade drive spring 14. Accordingly, the reduction of the size of the shutter device may not be hindered.

Figure 5A:
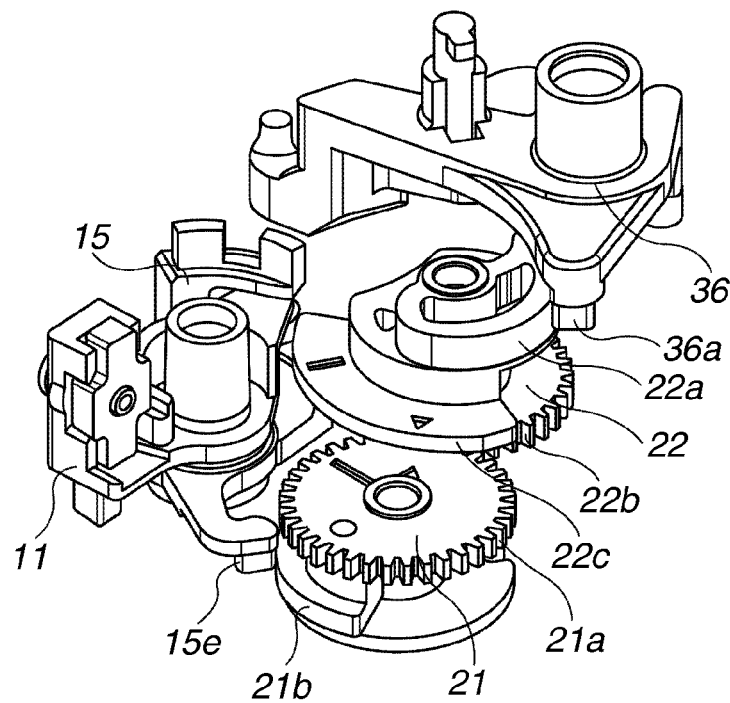
FIGS. 5A and 5B illustrate a first cam gear and a second cam gear.
Figure 5B:
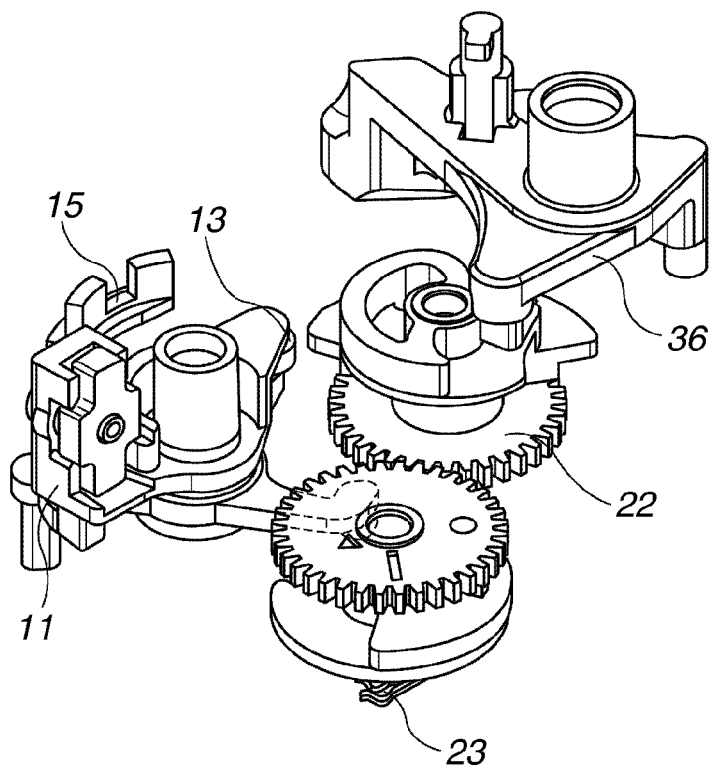

FIGS. 5A and 5B illustrate the first cam gear 21 and the second cam gear 22. A gear 21a and a cam 21b are provided to the first cam gear 21. The gear 21a engages a gear 22b of the second cam gear 22. Accordingly, the rotation of the first cam gear 21 is transmitted to the second cam gear 22. The gear 21a functions as a first gear portion. The gear 22b functions as a second gear portion.

The cam 21b is a cam traced by a cam follower 15e of the blade lever 15. In the state illustrated in FIG. 5A, the cam 21b and the cam follower 15e contact each other. In this state, a counterclockwise force from the blade return spring 46 is applied to the blade lever 15 but the pivoting operation of the blade lever 15 is prevented by the contact between the cam 21b and the cam follower 15e. Accordingly, the first cam gear 21 retains the blade lever 15 to close the apertures 1a and 2a by the first blade 41 and the second blade 42.

In the state illustrated in FIG. 5B, the first cam gear 21 is rotated in the counterclockwise direction from the state illustrated in FIG. 5A. Furthermore, in the state illustrated in FIG. 5B, the cam 21b is detached from the cam follower 15e. Furthermore, the blade lever 15 is pivoted by the blade return spring 46 in the counterclockwise direction.

When the first cam gear 21 is rotated in the counterclockwise direction from the state illustrated in FIG. 5B, the cam 21b contacts the cam follower 15e and the blade lever 15 is pivoted in the clockwise direction. In the above-described manner, the blade return spring 46 is charged.

The phase armature 23 is provided on the bottom surface of the cam portion 21b. The phase armature 23 contacts a pattern portion 38c of the FPC 38. The phase armature 23 detects a rotation phase of the first cam gear 21.

A first cam 22a, the gear 22b, and the second cam 22c are provided to the second cam gear 22. The gear 22b engages a transmission gear (not illustrated). Accordingly, a drive force from a motor (not illustrated) is transmitted via the transmission gear.

The gear 22b has the same number of teeth as the number of teeth of the gear 21a. The gear 22b and the gear 21a engage each other at a predetermined phase. Accordingly, the first cam gear 21 and the second cam gear 22 rotate at the predetermined phase and with the same rotation frequency.

The first cam 22a, which a first cam portion, contacts a cam follower 36a of the mirror lever 36. The first cam 22a causes the mirror lever 36 to pivot between the mirror-up position and the mirror-down position. More specifically, the second cam gear 22 descends the main mirror 6 downwards into the photographic optical path when the first cam 22a and the cam follower 36a of the mirror lever 36 contact each other at a first position. In addition, the second cam gear 22 ascends, causing the main mirror 6 to retract from the photographic optical path when the first cam 22a and the cam follower 36a of the mirror lever 36 are detached from each other at a second position. The second cam 22c, which is a second cam portion, contacts the stored roller 13 retained by the drive lever 11. The second cam 22c functions to charge and discharge the drive lever 11.

Figure 6:
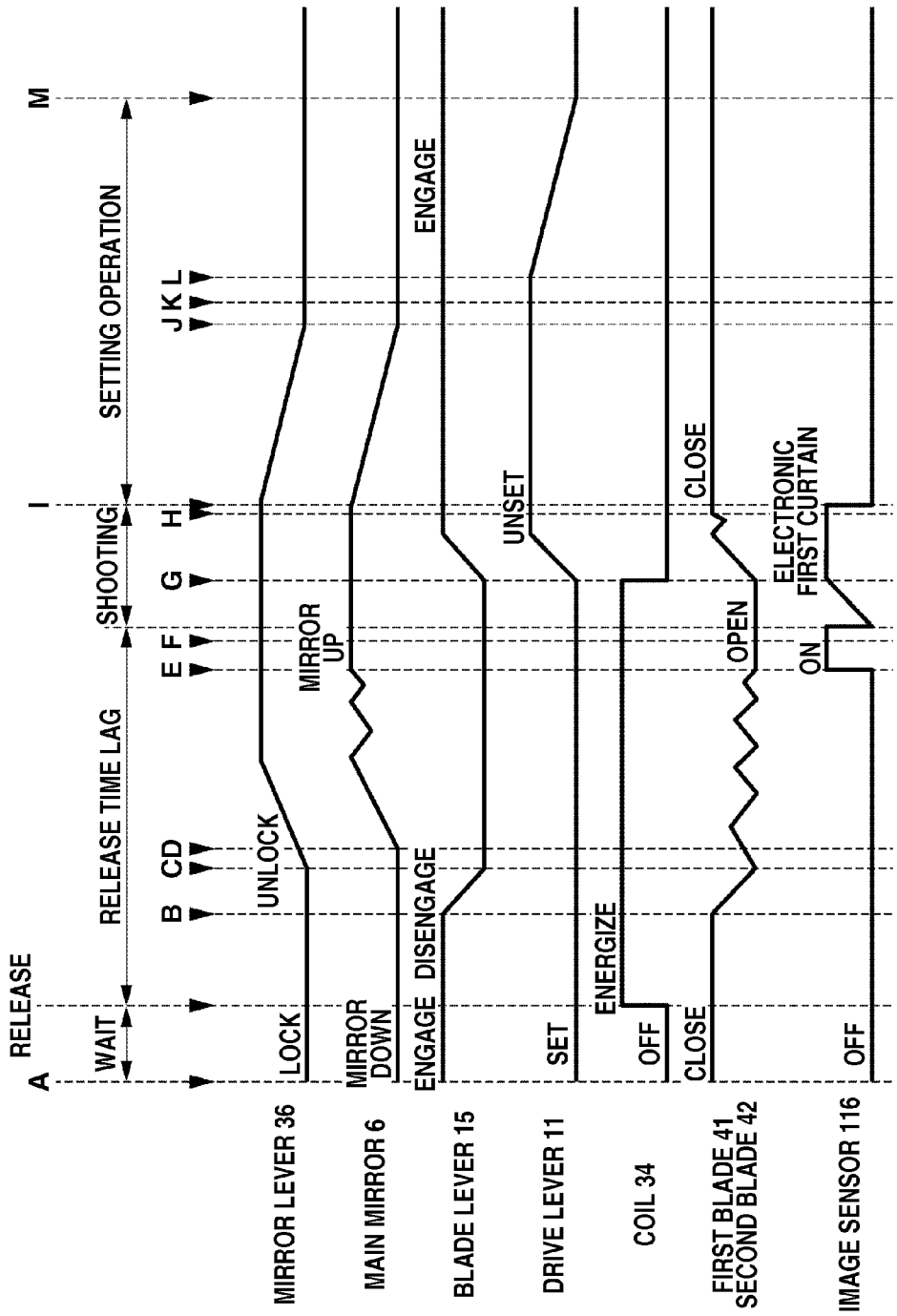
FIG. 6 is a timing chart illustrating operation timings of a mirror lever, a main mirror, the blade lever, the drive lever, a coil, a blade group, and an image sensor.

FIG. 6 is a timing chart illustrating timings of operations of the mirror lever 36, the main mirror 6, the blade lever 15, the drive lever 11, the coil 34, the blade group, and the image sensor 116. Operations executed by the shutter unit 100 during a time period from a state A to a state M illustrated in FIG. 6 will be described in detail below with reference to FIGS. 7A through 7C, 15A, and 15B.

Figure 7A:
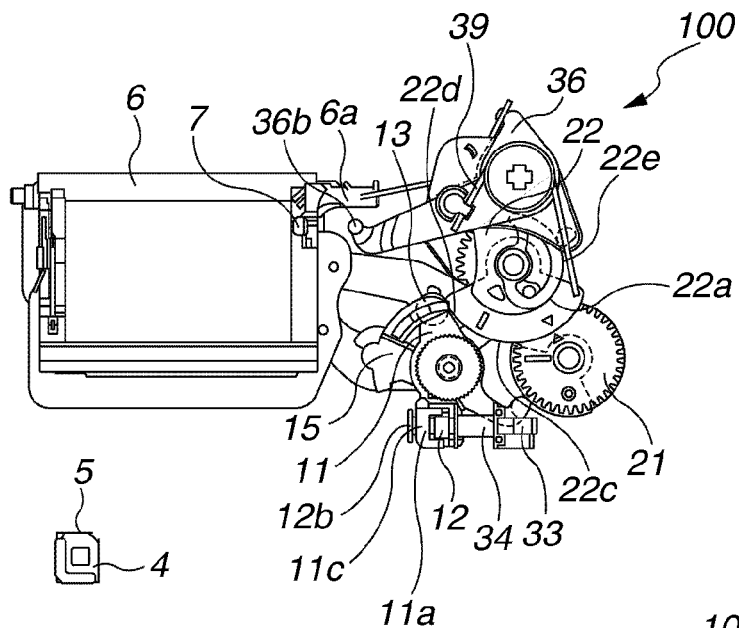
FIGS. 7A through 7C illustrate a state in which the shutter unit is in a pre-release standby state.
Figure 7B:
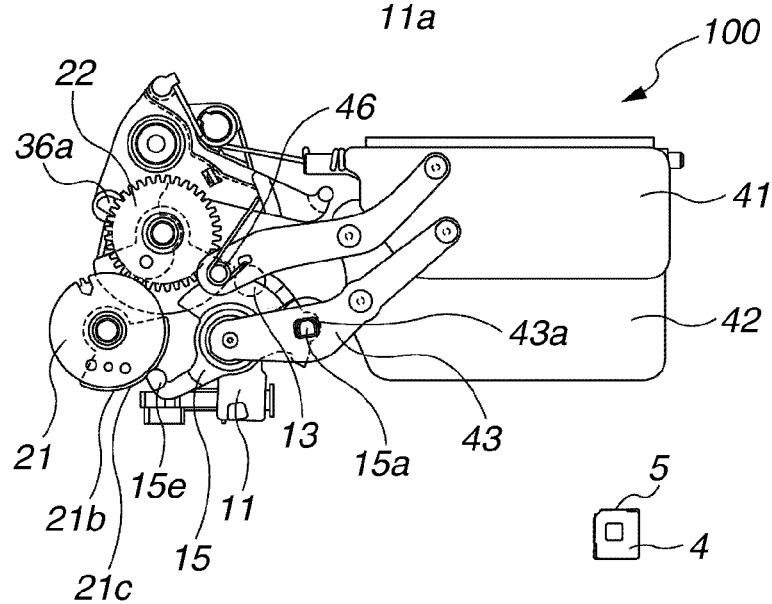
Figure 7C:
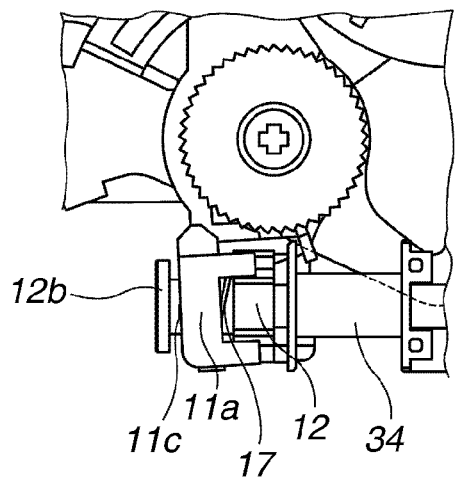

The state A illustrated in FIG. 6 is a pre-release standby state. FIGS. 7A through 7C illustrate states of the shutter unit 100 in the pre-release standby state. FIG. 7A illustrates the shutter unit 100 viewed from the main mirror 6. FIG. 7B illustrates the shutter unit 100 viewed from the image sensor 116.

In FIGS. 7A through 7C, the shutter base plate 1, the cover plate 2, and the auxiliary base plate 31 are omitted for easier understanding of operations of the cam gears and the levers. In the pre-release standby state, the first cam gear 21 and the second cam gear 22 are stopped at each corresponding position illustrated in FIGS. 7A and 7B.

The roller 13, which is retained by the drive lever 11, contacts the cam top portion 22d of the second cam 22c of the second cam gear 22. In the state illustrated in each of FIGS. 7A and 7B, the drive lever 11 has overcharged the blade drive spring 14. In the state in which the blade drive spring 14 has been overcharged, the drive lever 11 has been moved in the direction of charging the blade drive spring 14 over a position at which the yoke 33 can retain the armature 12 when the coil 34 has been energized.

Referring to FIG. 7C, in the overcharged state, the armature 12 contacts the yoke 33. In addition, in this state, the armature supporting portion 11a of the blade drive member (the drive lever 11) compresses the armature spring 17. Accordingly, the flange 12b of the armature 12 is separated from the protrusion 11c of the drive lever 11. The cam follower 15e of the blade lever 15 contacts the cam top 21c of the cam 21b of the first cam gear 21. As described above, the blade lever 15 is locked in the state illustrated in FIG. 7B.

Referring to FIG. 7B, the blade return spring 46 presses the sub arm 44 in the clockwise direction but the blade lever 15 has been locked. Accordingly, the first blade 41 and the second blade 42 are retained against the urging force from the blade return spring 46 in the state in which the apertures 1a and 2a are closed.

In this state, the roller bearing portion 15d of the blade lever 15 is located opposite the roller 13 to prevent falling off of the roller 13 from the roller supporting shaft 11d. The cam follower 36a of the mirror lever 36 contacts a cam top portion 22e of the first cam 22a of the second cam gear 22. As illustrated in FIG. 7A, the mirror lever 36 retains the mirror lever drive spring 39 while charging the mirror lever drive spring 39.

The main mirror 6 is pressed by the main mirror drive spring 7 in the mirror-down direction. The main mirror 6 becomes the mirror-down state when the main mirror 6 contacts a stopper (not illustrated). In this state, a gap is formed between the shaft portion 6a of the main mirror 6 and a contact portion 36b of the mirror lever 36.

With the above-described configuration, the main mirror 6 can be positioned by the stopper (not illustrated) at a correct position even if any error has occurred in positioning the mirror lever 36.

If a release signal is input in the pre-release standby state, the coil 34 is energized and the yoke 33 attracts the armature 12. At the same time, when the motor (not illustrated) is energized and the first cam gear 21 and the second cam gear 22 are rotated, the blade lever is unlocked (a state B illustrated in FIG. 6). In the state B illustrated in FIG. 6, the blade lever has been unlocked.

Figure 8A:
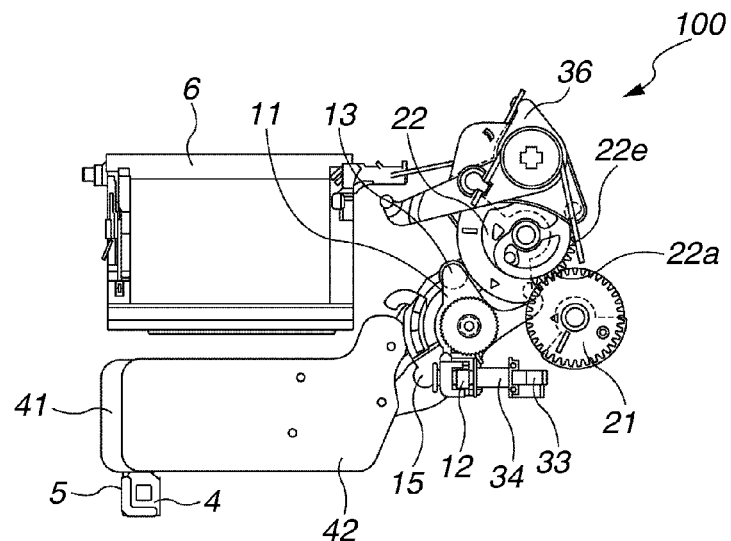
FIGS. 8A through 8C illustrate a state in which the shutter unit is in a blade lever unlocked state.
Figure 8B:
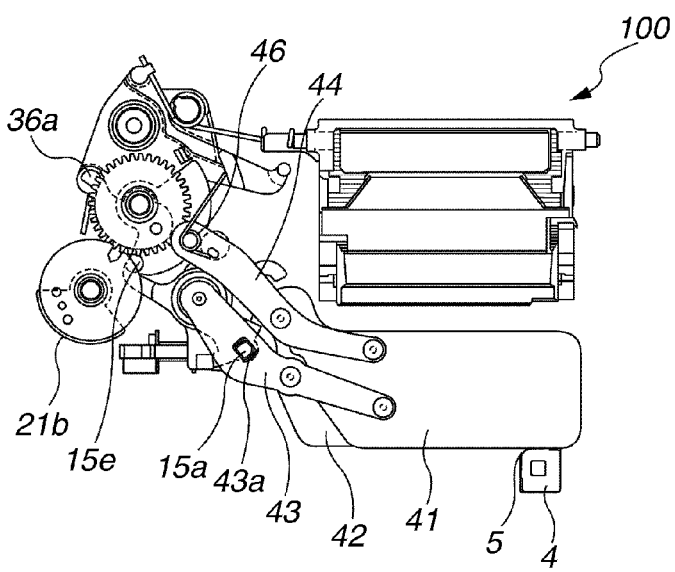
Figure 8C:
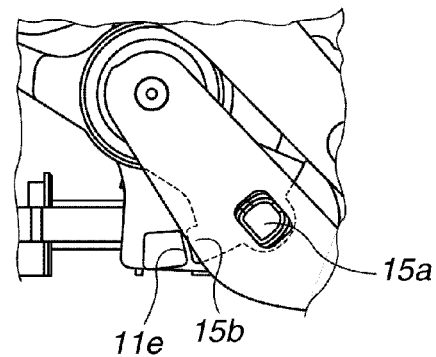

FIGS. 8A through 8C illustrate exemplary states in the state in which the blade lever has been unlocked. FIG. 8A illustrates the shutter unit 100 viewed from the main mirror 6. FIG. 8B illustrates the shutter unit 100 viewed from the image sensor 116.

In FIGS. 8A through 8C, the shutter base plate 1, the cover plate 2, and the auxiliary base plate 31 are omitted for easier understanding of operations of the cam gears and the levers. In the blade lever unlocked state, the first cam gear 21 and the second cam gear 22 are stopped at each corresponding position illustrated in FIGS. 8A and 8B.

In the following description, states different from the pre-release standby state illustrated in FIGS. 7A through 7C only will be described and the state that does not change from the pre-release standby state will not be described in detail.

When the motor (not illustrated) is energized, the first cam gear 21 is rotated from the state illustrated in FIGS. 7A and 7B to the state illustrated in FIGS. 8A and 8B. When the first cam gear 21 is rotated to be in the state illustrated in FIGS. 8A and 8B, the cam follower 15e of the blade lever 15 is detached from the cam top 21c of the cam 21b of the first cam gear 21. To paraphrase this, the cam 21b retracts from a pivoting locus of the cam follower 15e of the blade lever 15 to unlock the blade lever 15. As a result, the blade lever 15 shifts to a state in which the blade lever 15 can pivot around the shaft 1b.

When the blade lever 15 is unlocked, the first blade 41 and the second blade 42 travel in the direction of opening the apertures 1a and 2a due to the urging force from the blade return spring 46, which presses the sub arm 44. Following the above-described operation, the blade lever 15 pivots around the shaft 1b.

At the same time, the roller 13, which is mounted on the roller supporting shaft 11d of the drive lever 11, moves along the roller bearing portion 15d of the blade lever 15 without being disengaged from the roller supporting shaft 11d. In the blade lever unlocked state, as illustrated in FIGS. 8A and 8B, after the first blade 41 and the second blade 42 have travelled in the direction of opening the aperture 1a and the aperture 2a, the first blade 41 and the second blade 42 collide with the blade cushioning member 4 in a mutually overlapped state.

The blade cushioning member 4 alleviates the impact that acts on the first blade 41 and the second blade 42 when the first blade 41 and the second blade 42 have completely travelled. The blade cushioning member 4 is surrounded by and covered with the blade contact member 5.

More specifically, when the first blade 41 and the second blade 42 collide with the blade cushioning member 4 in the mutually overlapped state, the blade contact member 5 is located between the blade group including the first blade 41 and the second blade 42 and the blade cushioning member 4. The blade contact member 5 is made of a material having a wear resistance higher than the wear resistance of the blade cushioning member 4.

When the first blade 41 and the second blade 42 collide with the blade cushioning member 4, the first blade 41 and the second blade 42 directly contact the blade contact member 5 without directly contacting the blade cushioning member 4. Because the blade contact member 5 is made of a material having a high wear resistance, such as a metal material, dust particles that may be generated due to wear may hardly be generated even when the first blade 41 and the second blade 42 directly contact the blade contact member 5.

Because the first blade 41 and the second blade 42 do not directly contact the blade cushioning member 4, the blade cushioning member 4 can be made of a material having a high impact absorption performance even if dust particles may be easily generated even if the first blade 41 and the second blade 42 should collide with the blade cushioning member 4.

As illustrated in FIGS. 8A and 8B, when the first blade 41 and the second blade 42 contact the blade contact member 5, a gap is formed between the projection portion 11e and the projection portion 15b of the blade lever 15 as illustrated in FIG. 8C. In the example illustrated in FIG. 7C, the blade drive spring 14 has been overcharged. If the first blade 41 and the second blade 42 travel in the direction of opening the apertures 1a and 2a due to the urging force from the blade return spring 46 in the overcharged state, the blade lever 15 never contacts the drive lever 11.

Accordingly, the impact arising when the first blade 41 and the second blade 42 travel in the direction of opening the apertures 1a and 2a due to the urging force from the blade return spring 46 is never transmitted to the drive lever 11.

In the state in which the blade drive spring 14 has been overcharged, the drive lever 11 has pressed the armature 12 against the yoke 33. If an impact is applied to the drive lever 11 in this state, the armature 12 and an attraction force receiving surface of the yoke 33 may be damaged.

Any damage on the armature 12 and the attraction force receiving surface of the yoke 33 may degrade the accuracy of exposure. The present exemplary embodiment can prevent the damage on the armature 12 and the attraction force receiving surface of the yoke 33 as described above.

When the first blade 41 and the second blade 42 travel in the direction of opening the apertures 1a and 2a due to the urging force from the blade return spring 46 and contact the blade contact member 5, the first blade 41 and the second blade 42 hop as illustrated in FIG. 6.

When the state shifts from the pre-release standby state to the blade lever unlocked state, the second cam gear 22 rotates as the first cam gear 21 rotates. As illustrated in FIG. 8A, on the second cam gear 22, the cam follower 36a of the mirror lever 36 contacts the cam top portion 22e of the first cam 22a of the second cam gear 22.

Accordingly, similarly to the state illustrated in FIG. 7A, the mirror lever 36 is retained in the state in which the mirror lever drive spring 39 has been charged. In addition, the main mirror 6, similarly to the state illustrated in FIG. 7A, is pressed by the main mirror drive spring 7 in the mirror-down direction to shift to the mirror-down state by contacting the stopper (not illustrated). More specifically, the first blade 41 and the second blade 42 shift to the state of opening the apertures 1a and 2a but the main mirror 6 remains to be in the mirror-down state.

When the motor (not illustrated) is continuously energized, the first cam gear 21 and the second cam gear 22 are rotated and the state shifts to a mirror lever unlocked state illustrated in FIG. 6. In FIG. 6, a state C illustrates the mirror lever unlocked state.

The first cam gear 21 and the second cam gear 22 further rotate from the state illustrated in FIG. 6. When the second cam gear 22 rotates, the cam follower 36a of the mirror lever 36 is detached from the first cam 22a of the second cam gear 22.

After the first cam 22a has retracted from the pivoting locus of the cam follower 36a, the mirror lever 36 is unlocked. In addition, the mirror lever 36 is turned by the urging force from the mirror lever drive spring 39 in the clockwise direction in FIG. 8A.

In the pre-release standby state, a gap is formed between the shaft portion 6a of the main mirror 6 and the contact portion 36b of the mirror lever 36. Accordingly, after the mirror lever 36 has been turned in the clockwise direction in FIG. 8A by an amount equivalent to the gap, the contact portion 36b of the mirror lever 36 contacts the shaft portion 6a of the main mirror 6.

When the contact portion 36b of the mirror lever 36 contacts the shaft portion 6a of the main mirror 6, the state shifts to a state D (FIG. 6), which is equivalent to a mirror lever contact state. In the mirror lever contact state, the contact portion 36b of the mirror lever 36 contacts the shaft portion 6a of the main mirror 6. In addition, in this state, the mirror lever 36 starts pivoting the main mirror 6 in the mirror-up direction against the urging force from the main mirror drive spring 7.

When the main mirror 6 contacts the stopper (not illustrated), the main mirror 6, as illustrated in FIG. 6, stops at the mirror-up position after a hopping action. In order to reduce the time of hopping of the main mirror 6, the mirror lever drive spring 39 is provided with a relatively great spring force.

Accordingly, the time of hopping of the main mirror 6 becomes shorter than the time of hopping of the first blade 41 and the second blade 42 in the blade lever unlocked state. When the hopping of the main mirror 6 ends, the main mirror 6 shifts to a state E (FIG. 6), which is equivalent to a mirror-up live view state. The state E illustrated in FIG. 6 illustrates the mirror-up live view state.

Figure 9A:
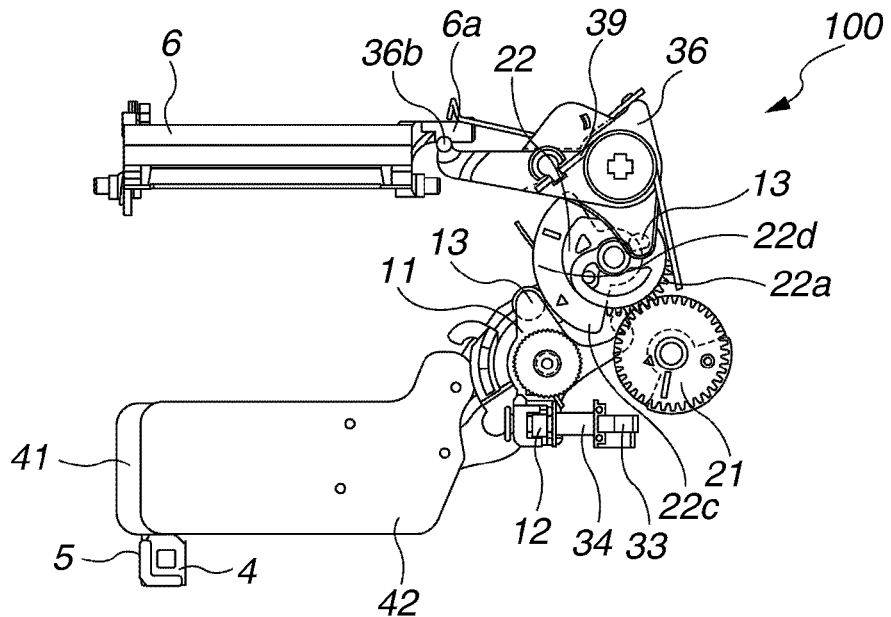
FIGS. 9A and 9B illustrate a state in which the shutter unit is in a mirror-up live view state.
Figure 9B:
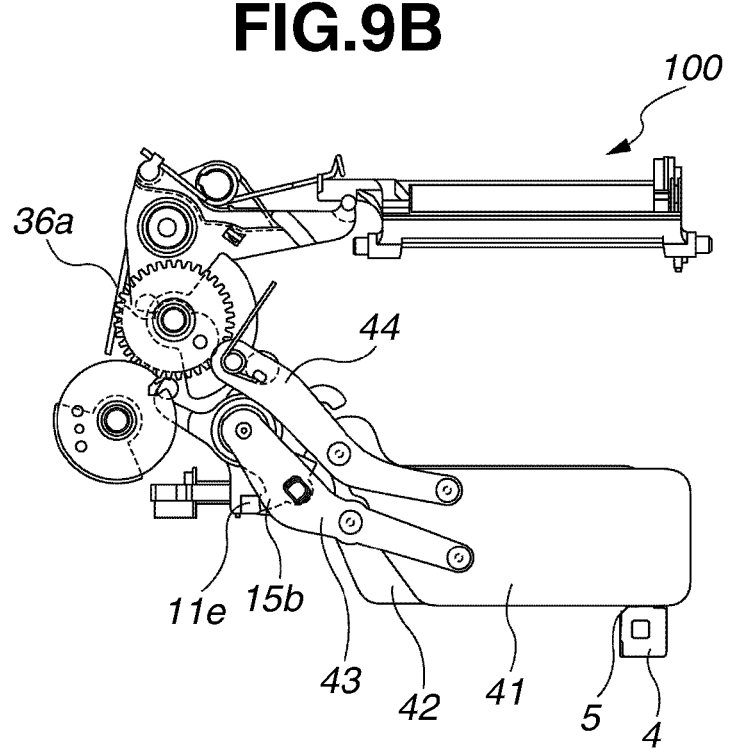

FIGS. 9A and 9B illustrate states of the shutter unit 100 in the mirror-up live view state. FIG. 9A illustrates the shutter unit 100 viewed from the main mirror 6. FIG. 9B illustrates the shutter unit 100 viewed from the image sensor 116.

In FIGS. 9A and 9B, the shutter base plate 1, the cover plate 2, and the auxiliary base plate 31 are omitted for easier understanding of operations of the cam gears and the levers. In the mirror-up live view state, the first cam gear 21 and the second cam gear 22 are stopped at each corresponding position illustrated in FIGS. 9A and 9B.

The drive lever 11 and the blade lever 15 are in each corresponding state similar to the state illustrated in FIGS. 8A and 8B. More specifically, the first blade 41 and the second blade 42 are in the state in which the first blade 41 and the second blade 42 travel to open the apertures 1a and 2a to contact the blade contact member 5 in this state.

In the mirror-up live view state, the retained roller 13, which is retained by the drive lever 11, contacts the cam top portion 22d of the second cam 22c of the second cam gear 22. Accordingly, in this state, the blade drive spring 14 is overcharged.

Accordingly, in the mirror-up live view state, a gap is formed between the projection portion 11e of the drive lever 11 and the projection portion 15b of the blade lever 15 as illustrated in FIG. 8C. In addition, as described above, the cam follower 36a of the mirror lever 36 is detached from the first cam 22a of the second cam gear 22. Furthermore, the mirror lever 36 is turned by the urging force from the mirror lever drive spring 39.

In addition, the mirror lever 36 pivots the main mirror 6 in the mirror-up direction against the urging force from the main mirror drive spring 7. If the motor (not illustrated) is stopped in this state, a light flux from the interchangeable lens 201 reaches the image sensor 116. In addition, the state of the imaging apparatus shifts to a live view state, in which an object image captured by the image sensor 116 is displayed on a display monitor.

In the mirror-up live view state, the roller 13, which is retained by the drive lever 11, contacts the cam top portion 22d of the second cam 22c of the second cam gear 22. Accordingly, if the energization of the coil 34 is discontinued, the first blade 41 and the second blade 42 remain in the state in which the first blade 41 and the second blade 42 have travelled to open the apertures 1a and 2a.

The motor (not illustrated) is energized in the mirror-up live view state to rotate the first cam gear 21 and the second cam gear 22. Then in a state F (FIG. 6), which illustrates an unset state, the motor is stopped. The state F illustrated in FIG. 6 corresponds to the unset state.

Figure 10A:
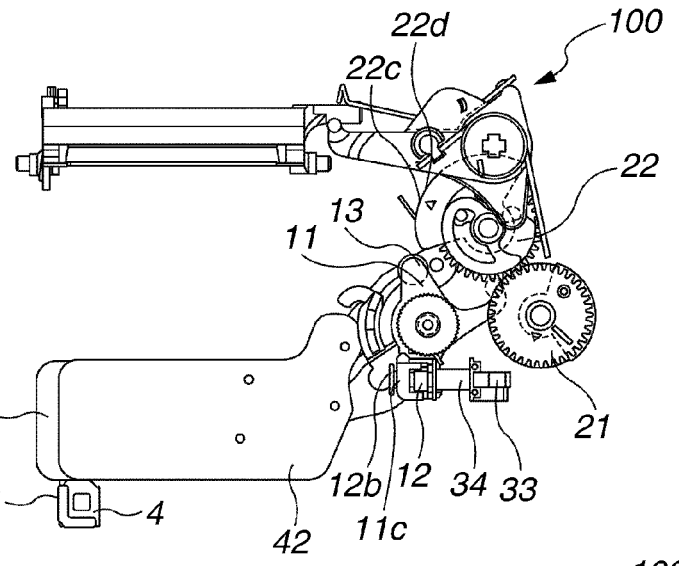
FIGS. 10A through 10D illustrate a state in which the shutter unit is in an unset state.
Figure 10B:
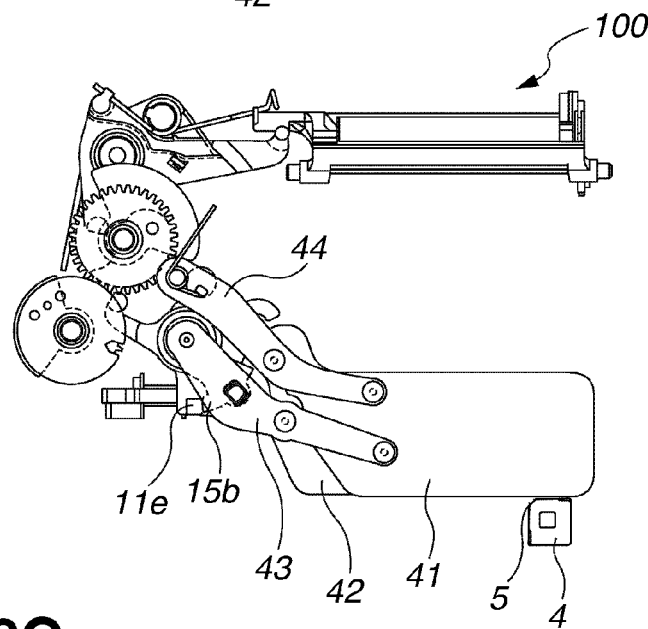

FIGS. 10A through 10D illustrate a state in which the shutter unit 100 is in the unset state. FIG. 10A illustrates the shutter unit 100 viewed from the main mirror 6. FIG. 10B illustrates the shutter unit 100 viewed from the image sensor 116.

In FIGS. 10A and 10B, the shutter base plate 1, the cover plate 2, and the auxiliary base plate 31 are omitted for easier understanding of operations of the cam gears and the levers. In the unset state, the first cam gear 21 and the second cam gear 22 are stopped at each corresponding position illustrated in FIGS. 10A and 10B.

In the unset state, when the second cam gear 22 rotates, the roller 13, which is retained by the drive lever 11, is detached from the cam top portion 22d of the second cam 22c of the second cam gear 22. Accordingly, the drive lever 11 pivots in the clockwise direction of FIG. 10A due to the urging force from the blade drive spring 14. In addition, the overcharging of the blade drive spring 14 is discharged.

Even after the roller 13 is detached from the second cam gear 22*d* of the second cam 22*c*, the armature 12 is attracted by the yoke 33 because the coil 34 has been continuously energized. In addition, the first blade 41 and the second blade 42 remain in the state in which the apertures 1*a* and 2*a* are opened.

Figure 10C:
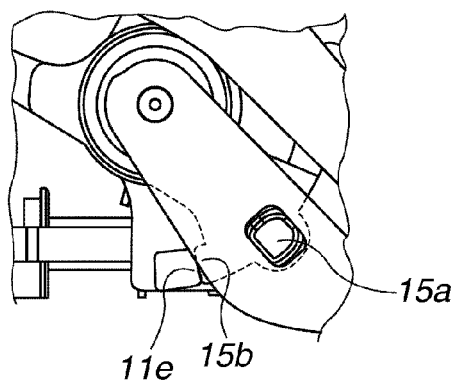

After the overcharging of the blade drive spring 14 is discharged, the flange 12*b* of the armature 12 contacts the protrusion 11*c* of the blade drive member (the drive lever 11) due to the urging force from the armature spring 17. Accordingly, as illustrated in FIG. 10C, the drive lever 11 slightly pivots and the projection portion 11*e* of the drive lever 11 contacts the projection portion 15*b* of the blade lever 15.

Figure 10D:
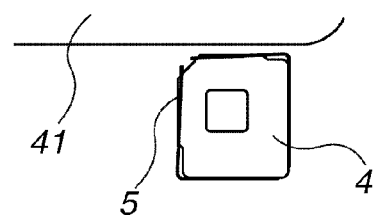

Referring to FIG. 10D, when the projection portion 11*e* of the drive lever 11 presses the projection portion 15*b* of the blade lever 15, the first blade 41 and the second blade 42 are detached from the blade contact member 5. More specifically, when the coil 34 is energized in the state in which the blade drive spring 14 is overcharged, the yoke 33 attracts the armature 12. In addition, the blade lever 15 contacts the drive lever 11 before the overcharging of the blade drive spring 14 is discharged.

In the unset state, similar to the state of the main mirror 6 in the mirror-up live view state, the main mirror 6 is stopped at the mirror-up position. As illustrated in FIG. 6, an imaging and exposure operation starts when a pixel resetting scan operation on the image sensor 116 (hereinafter simply referred to as an "electronic first curtain travelling") is executed in the unset state.

Time from a timing of input of a release signal to a timing of start of the electronic first curtain travelling corresponds to a release time lag. In the present exemplary embodiment, the operation by the first blade 41 and the second blade 42 for opening the apertures 1*a* and 2*a*, whose hopping time is relatively long, is started before executing the mirror-up operation of the main mirror 6, whose hopping time is relatively short.

If the opening operation by the first blade 41 and the second blade 42 and the mirror-up operation for ascending the main mirror 6 are simultaneously started, the electronic first curtain travelling cannot be started until the hopping of the first blade 41 and the second blade 42 ends even if the hopping of the main mirror 6 has ended. As a result, the release time lag may become long.

In the present exemplary embodiment, the operation for ascending the main mirror 6 to the mirror-up state is started after the opening operation by the first blade 41 and the second blade 42 is started to prevent the above-described problem. In addition, in the present exemplary embodiment, by starting the operation for ascending the main mirror 6 to the mirror-up state after the opening operation by the first blade 41 and the second blade 42 is started, the threat of exposure to the first blade 41 and the second blade 42 to direct sunlight can be reduced.

With the above-described configuration, the damage that may occur if the first blade 41 and the second blade 42 are exposed to direct sunlight can be reduced if the first blade 41 and the second blade 42 made of a PET material containing a blackening are used.

By stopping the energization of the coil 34 after a time interval corresponding to a set shutter speed has elapsed after the electronic first curtain travelling has started, the state shifts to a state G (FIG. 6), which illustrates a blade travelling state. The state G illustrated in FIG. 6 corresponds to the blade travelling state.

Figure 11A:
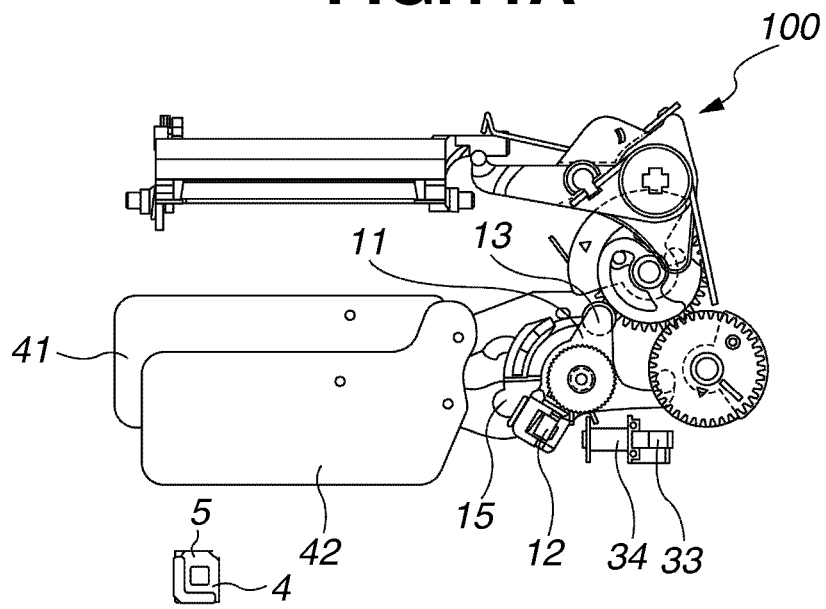
FIGS. 11A and 11B illustrate a state in which the shutter unit is in a blade travelling state.
Figure 11B:
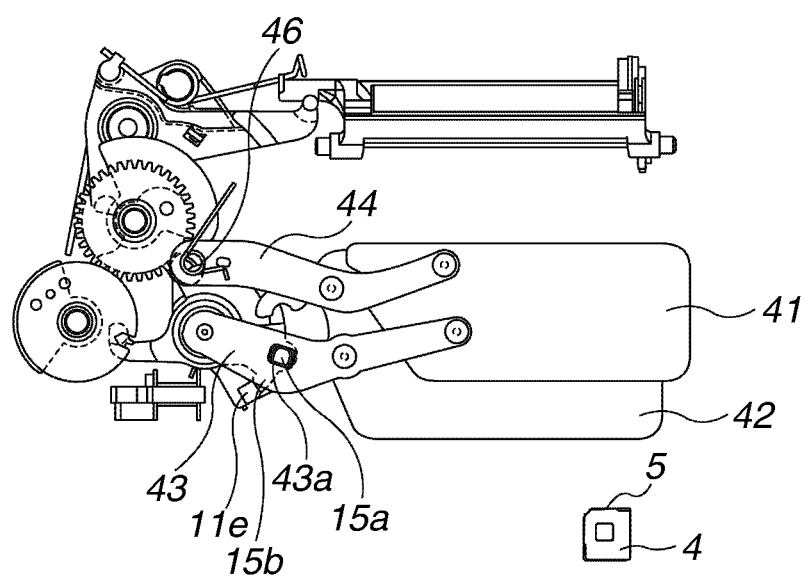

FIGS. 11A and 11B illustrate states of the shutter unit 100 in the blade travelling state. FIG. 11A illustrates the shutter unit 100 viewed from the main mirror 6. FIG. 11B illustrates the shutter unit 100 viewed from the image sensor 116. In FIGS. 11A and 11B, the shutter base plate 1, the cover plate 2, and the auxiliary base plate 31 are omitted for easier understanding of operations of the cam gears and the levers.

As illustrated in FIGS. 11A and 11B, when the energization of the coil 34 is discontinued, the first blade 41 and the second blade 42 cannot remain in the state in which the apertures 1*a* and 2*a* remain opened. The drive lever 11 pivots as illustrated in FIGS. 11A and 11B due to the urging force from the blade drive spring 14.

When the drive lever 11 is pivoted, the projection portion 11*e* of the drive lever 11 presses the projection portion 15*b* of the blade lever 15. Accordingly, the blade lever 15 also is pivoted. With the integrated operation of the drive lever 11 and the blade lever 15, the first blade 41 and the second blade 42 travel in the direction of closing the apertures 1*a* and 2*a* against the urging force from the blade return spring 46. In the unset state illustrated in FIGS. 10A through 10D, the projection portion 11*e* of the drive lever 11 has already contacted the projection portion 15*b* of the blade lever 15.

When the energization of the coil 34 is discontinued, the drive lever 11 and the blade lever 15 integrally pivot due to the urging force from the blade drive spring 14. More specifically, in the present exemplary embodiment, when the first blade 41 and the second blade 42 have travelled in the direction of closing the apertures 1*a* and 2*a*, the drive lever 11 and the blade lever 15 integrally pivot even from the start of the travel of the first blade 41 and the second blade 42.

In the middle of travelling the first blade 41 and the second blade 42 in the direction of closing the apertures 1*a* and 2*a*, the projection portion 11*e* of the drive lever 11 may collide with the projection portion 15*b* of the blade lever 15 before the integral pivoting operation of the drive lever 11 and the blade lever 15. However, in this case, the pivot speed may vary across the timing of collision with 115. As a result, the accuracy of travel of the first blade 41 and the second blade 42 may degrade.

In the present exemplary embodiment, before travelling the first blade 41 and the second blade 42, the drive lever 11 and the blade lever 15 are integrated together. In addition, during the travel of the first blade 41 and the second blade 42, the drive lever 11 and the blade lever 15 integrally pivot.

Accordingly, the pivoting speed of the drive lever 11 and the blade lever 15 becomes stabilized. In addition, the first blade 41 and the second blade 42 can travel with a high accuracy. In addition, with the integrated pivoting operation of the drive lever 11 and the blade lever 15, the relative positions of the roller 13, which is mounted on the roller supporting shaft 11*d* of the drive lever 11, and the roller bearing portion 15*d* of the blade lever 15 may not vary.

With the above-described configuration, no friction may arise between the roller 13 and the roller bearing portion 15*d* during the travel of the first blade 41 and the second blade 42 in the direction of closing the apertures 1*a* and 2*a*. In addition, coefficients of friction may not vary because the relative positions of the roller 13 and the roller bearing portion 15*d* may not vary even if the direction of gravity acting on the roller due to a change of orientation of the imaging apparatus.

With the above-described configuration, the present exemplary embodiment can reduce the friction that may arise when the first blade 41 and the second blade 42 travel in the direction of closing the apertures 1*a* and 2*a*. In addition, in the present exemplary embodiment, the first blade 41 and the second blade 42 can travel with a high accuracy.

When the first blade 41 and the second blade 42 are travelled to the position of closing the apertures 1*a* and 2*a*, the state shifts to a state H (FIG. 6), which illustrates a blade travel complete state. The state H illustrated in FIG. 6 corresponds to the blade travel complete state.

Figure 12A:
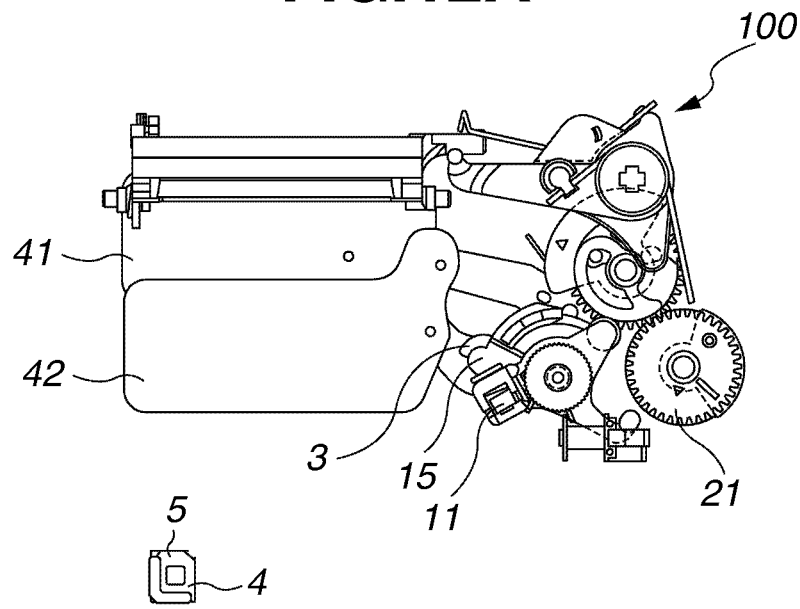
FIGS. 12A and 12B illustrate a state in which the shutter unit is in a blade travel complete state.
Figure 12B:
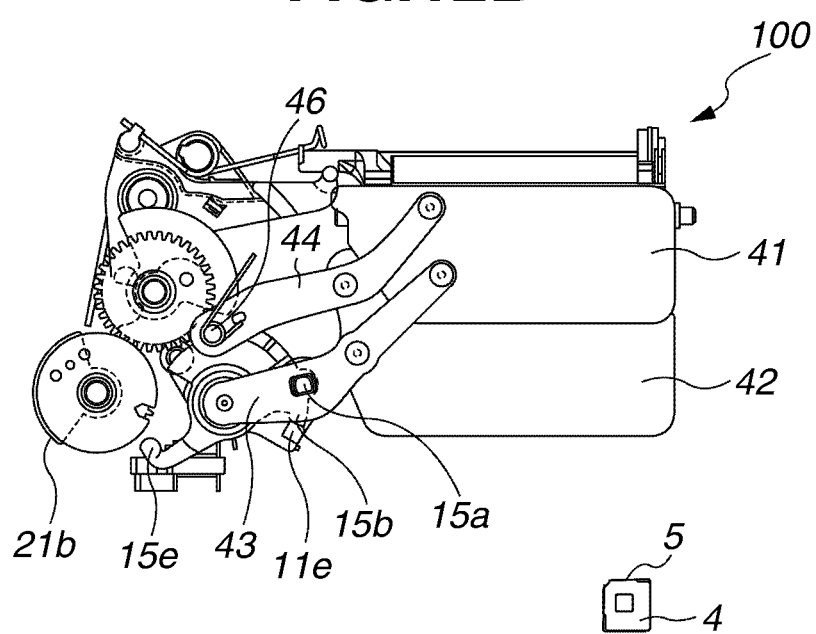

FIGS. 12A and 12B illustrate states of the shutter unit 100 in the blade travel complete state. FIG. 12A illustrate the shutter unit 100 viewed from the main mirror 6. FIG. 12B illustrates the shutter unit 100 viewed from the image sensor 116. In FIGS. 12A through 12C, the shutter base plate 1, the cover plate 2, and the auxiliary base plate 31 are omitted for easier understanding of operations of the cam gears and the levers.

When the engaging portion 15*a*, which is provided to the blade lever 15, collides with the semicircular cushioning member 3, which is provided over the perforation 1*e*, which is provided to the shutter base plate 1, the first blade 41 and the second blade 42 stop at the position of closing the apertures 1*a* and 2*a*.

In this state, the projection portion 11*e* of the drive lever 11 contacts the projection portion 15*b* of the blade lever 15. In the present exemplary embodiment, when the first blade 41 and the second blade 42 are travelled in the direction of closing the apertures 1*a* and 2*a*, the drive lever 11 and the blade lever 15 are integrally pivoted all through the time of travel of the first blade 41 and the second blade 42 from the beginning to the end thereof.

In the blade travel complete state illustrated in FIGS. 12A and 12B, when the first blade 41 and the second blade 42 travel to close the apertures 1*a* and 2*a*, the blade return spring 46 is charged. In addition, in the blade travel complete state, the photo sensor 32, which is provided to the auxiliary base plate 31, detects that the blade lever 15 has come to the pivoted position of the complete travel of the blades.

The motor (not illustrated) is energized after a predetermined time has elapsed since the energization of the coil 34 is stopped. When the motor is energized and the first cam gear 21 and the second cam gear 22 rotate, the state of the imaging apparatus becomes a state I (FIG. 6), which illustrates a mirror lever charging state. The state I illustrated in FIG. 6 corresponds to the mirror lever charging state.

When the first cam gear 21 and the second cam gear 22 rotate from the state illustrated in FIGS. 12A and 12B, the first cam 22*a* of the second cam gear 22 contacts the cam follower 36*a* of the mirror lever 36. The mirror lever 36 pivots in the counterclockwise direction in FIG. 12A to charge the mirror lever drive spring 39.

When the mirror lever 36 pivots in the counterclockwise direction in FIG. 12A, the main mirror 6 turns in the mirror-down direction due to the urging force from the main mirror drive spring 7.

In the mirror lever charging state, similarly to the blade travel complete state, the first blade 41 and the second blade 42 remain stopped at the position of closing the apertures 1*a* and 2*a*. If the motor (not illustrated) is continuously energized in the mirror lever charging state, the first cam gear 21 and the second cam gear 22 further rotate. As a result, the state of the imaging apparatus shifts to a state J (FIG. 6), which illustrates a mirror lever charge complete state. The state J illustrated in FIG. 6 corresponds to the mirror lever charge complete state.

Figure 13A:
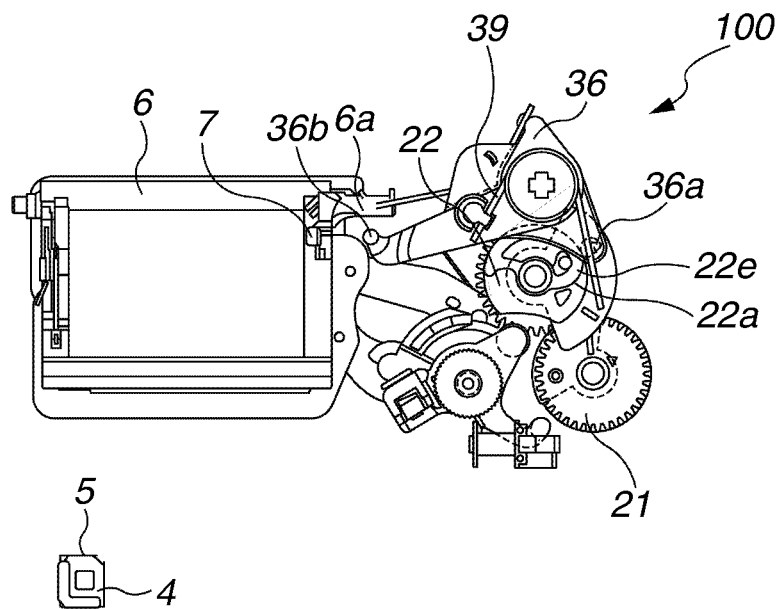
FIGS. 13A and 13B illustrate a state in which the shutter unit is in a mirror lever charge complete state.
Figure 13B:
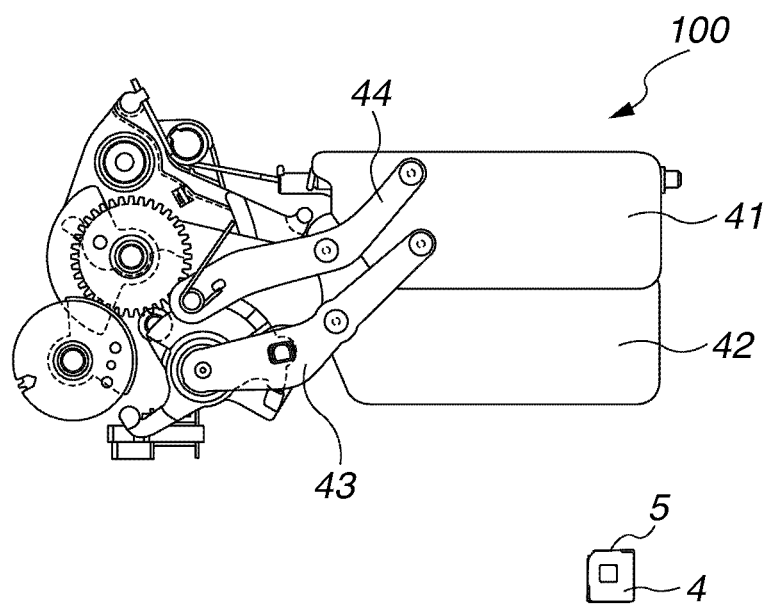

FIGS. 13A and 13B illustrate states of the shutter unit 100 in the mirror lever charge complete state. FIG. 13A illustrates the shutter unit 100 viewed from the main mirror 6. FIG. 13B illustrates the shutter unit 100 viewed from the image sensor 116. In FIGS. 13A through 13C, the shutter base plate 1, the cover plate 2, and the auxiliary base plate 31 are omitted for easier understanding of operations of the cam gears and the levers.

When the second cam gear 22 rotates in the counterclockwise direction in FIG. 13A from the mirror lever charging state, the mirror lever 36 charges the mirror lever drive spring 39. When the mirror lever 36 is turned as described above, the main mirror 6 is further turned in the mirror-down direction. Moreover, the main mirror 6 contacts the stopper (not illustrated) and stops there.

After the main mirror 6 has stopped at the mirror-down position, the second cam gear 22 continues its rotation. Accordingly, the cam follower 36*a* of the mirror lever 36 reaches the cam top the position 22*e* of the first cam 22*a* of the second cam gear 22.

In this state, a gap is formed between the shaft portion 6*a* of the main mirror 6 and the contact portion 36*b* of the mirror lever 36 as illustrated in FIG. 13A. As a result, the main mirror 6 is retained by the stopper (not illustrated) at the correct position even if any error has occurred in positioning the mirror lever 36.

When the motor (not illustrated) is continuously energized in the mirror lever charge complete state, the first cam gear 21 and the second cam gear 22 further rotate. Accordingly, the state of the imaging apparatus shifts to a state K (FIG. 6), which illustrates a blade lever lock enabled state. The state K illustrated in FIG. 6 corresponds to the blade lever lock enabled state.

Figure 14A:
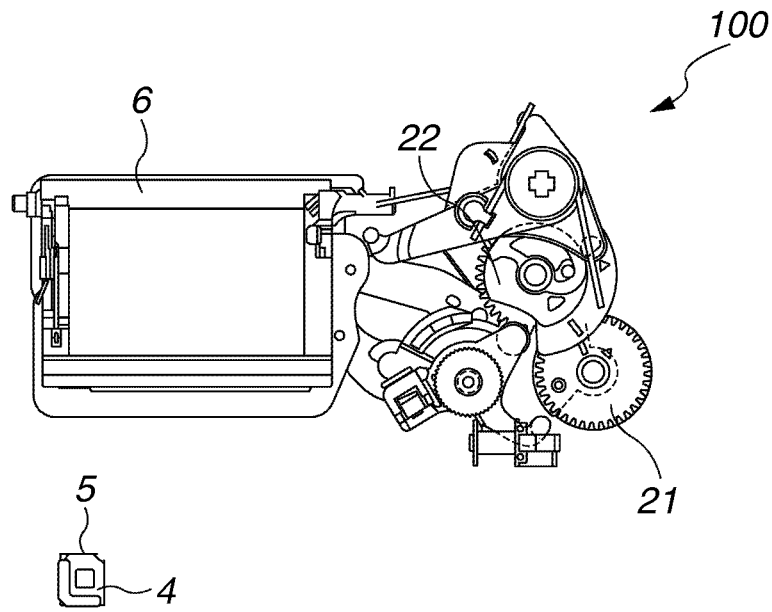
FIGS. 14A and 14B illustrate a state in which the shutter unit is in a blade lever lock enabled state.
Figure 14B:
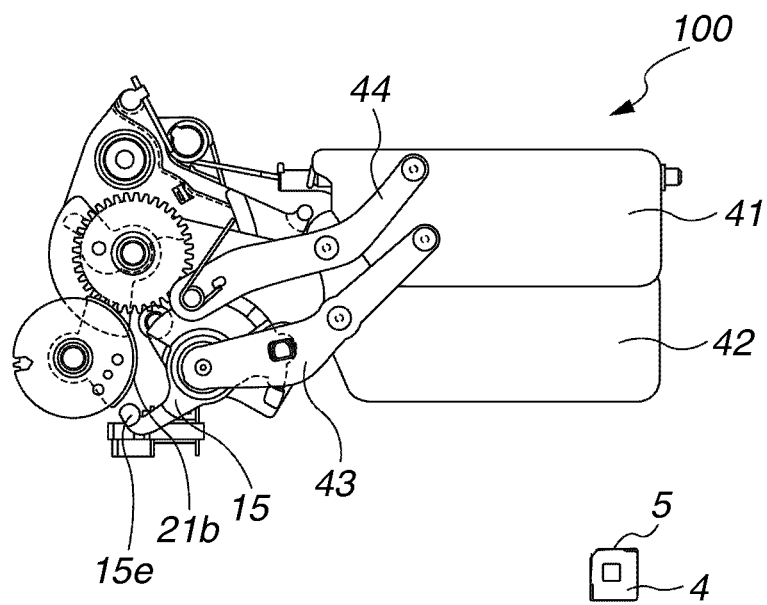

FIGS. 14A and 14B illustrate states of the shutter unit 100 in the blade lever lock enabled state. FIG. 14A illustrates the shutter unit 100 viewed from the main mirror 6. FIG. 14B illustrates the shutter unit 100 viewed from the image sensor 116. In FIGS. 14A through 14C, the shutter base plate 1, the cover plate 2, and the auxiliary base plate 31 are omitted for easier understanding of operations of the cam gears and the levers.

When the first cam gear 21 rotates, the cam 21*b* of the first cam gear 21 moves to a position at which the cam follower 15*e* of the blade lever 15 can contact the cam 21*b*. In the blade lever lock enabled state illustrated in FIGS. 14A and 14B, the projection portion 11*e* of the drive lever 11 keeps pressing the projection portion 15*b* of the blade lever 15 due to the urging force from the blade drive spring 14. Accordingly, the cam follower 15*e* of the blade lever 15 does not contact the cam 21*b* of the first cam gear 21.

When the motor (not illustrated) is continuously energized in the blade lever lock enabled state, the first cam gear 21 and the second cam gear 22 rotate. Accordingly, the state of the imaging apparatus shifts to a state L (FIG. 6), which illustrates a drive lever charging state. The state L illustrated in FIG. 6 corresponds to the drive lever charging state.

Figure 15A:
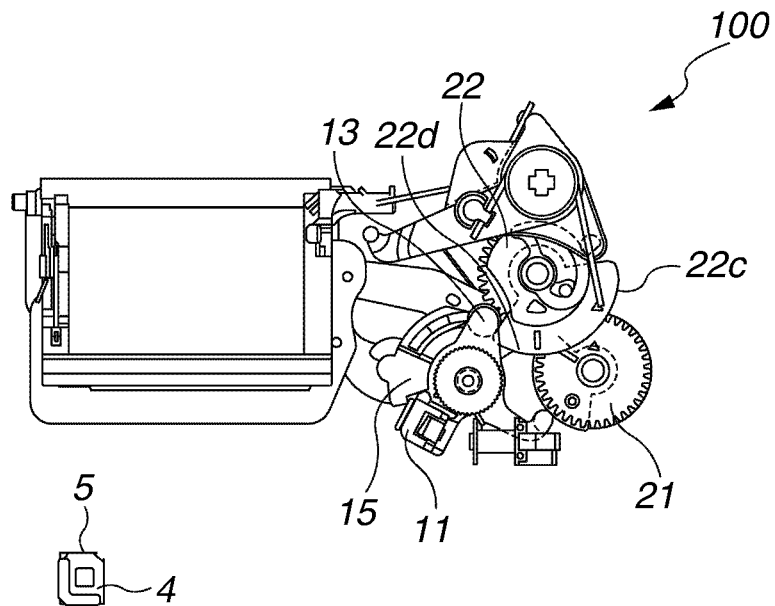
FIGS. 15A and 15B illustrate a state in which the shutter unit is in a drive lever charging state.
Figure 15B:
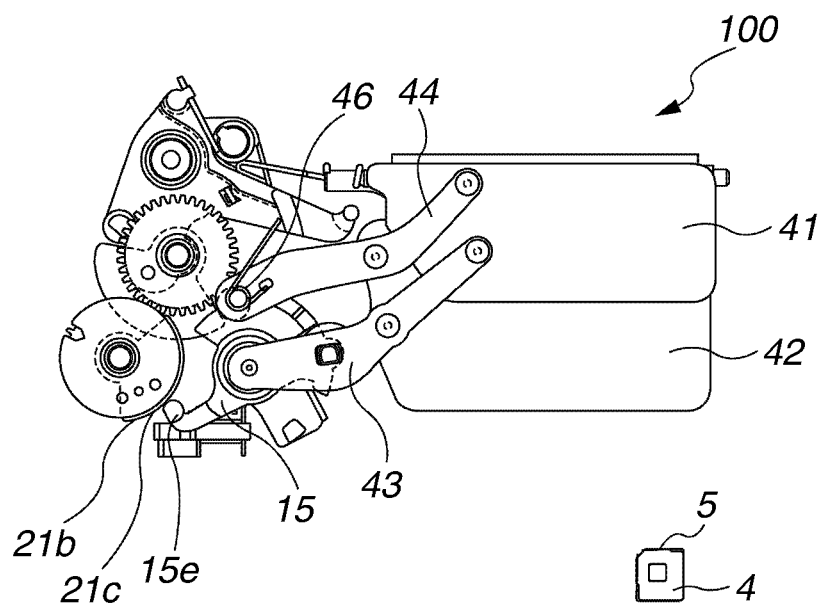

FIGS. 15A and 15B illustrate states of the shutter unit 100 in the drive lever charging state. FIG. 15A illustrates the shutter unit 100 viewed from the main mirror 6. FIG. 15B illustrates the shutter unit 100 viewed from the image sensor 116. In FIGS. 15A through 15C, the shutter base plate 1, the cover plate 2, and the auxiliary base plate 31 are omitted for easier understanding of operations of the cam gears and the levers.

When the second cam gear 22 rotates, the second cam 22*c* of the second cam gear 22 presses the retained roller 13, which is retained by the drive lever 11. Accordingly, the drive lever 11 turns in the counterclockwise direction in FIG. 15A to charge the drive spring 14.

When the drive lever 11 turns in the counterclockwise direction in FIG. 15A, the projection portion 11*e* of the drive lever 11 is detached from the projection portion 15b of the blade lever 15. Accordingly, the blade lever 15 turns in the counterclockwise direction in FIG. 15B due to the urging force from the blade return spring 46. In addition, the cam follower 15e of the blade lever 15 contacts the cam 21b of the first cam gear 21.

Accordingly, the blade lever 15 is kept at the position illustrated in FIG. 15B. In addition, the first blade 41 and the second blade 42 maintain the state of closing the aperture 1a and 2a.

When the motor (not illustrated) is continuously energized in the drive lever charging state, the second cam gear 22 further rotates. As a result, the state of the imaging apparatus shifts to a state M (FIG. 6), which illustrates a drive lever charge complete state. The state M illustrated in FIG. 6 corresponds to the drive lever charge complete state.

When the retained roller 13, which is retained by the drive lever 11, reaches the cam top portion 22d of the second cam 22c of the second cam gear 22, the drive lever 11 overcharges the blade drive spring 14. When the energization of the motor is discontinued in this state, the state of the imaging apparatus shifts to the state A illustrated in FIG. 6 (i.e., the pre-release standby state).

Figure 16A:
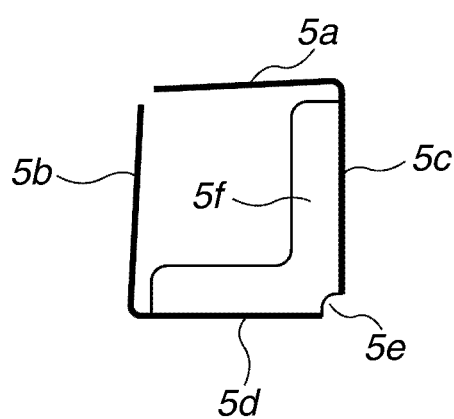
FIGS. 16A and 16B illustrate an exemplary shape of a blade cushioning member and a blade contact member.
Figure 16B:
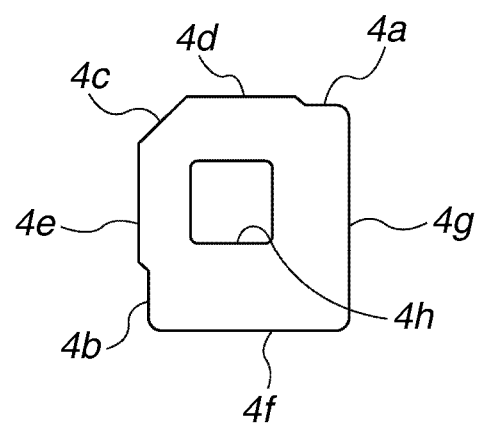

FIGS. 16A and 16B illustrate an exemplary shape of the blade cushioning member 4 and the blade contact member 5. FIG. 16A illustrates the shape of the blade contact member 5 before assembling the blade contact member 5 to the blade cushioning member 4. FIG. 16B illustrates an exemplary shape of the blade cushioning member 4 before assembling the blade contact member 5 to the blade cushioning member 4.

Referring to FIG. 16A, the blade contact member 5 always remains in contact with the blade cushioning member 4 by pressing the blade cushioning member 4 with the spring force from arm portions 5a and 5b along the side surface of the blade cushioning member 4 when the blade contact member 5 is assembled to the blade cushioning member 4, to stabilize the state of collision with the blades.

Referring to FIG. 16B, the blade cushioning member 4 includes portions 4a through 4f. The portion 4a is provided at a portion of the blade cushioning member 4 lower than the portion 4d by a predetermined step. The portion 4b is provided at a portion of the blade cushioning member 4 lower than the portion 4e by a predetermined step.

A hole 4h is provided to the blade cushioning member 4 at a decentered portion of the blade cushioning member 4. The shaft portion 1h of the shutter base plate 1 fits in the hole 4h. When the blade contact member 5 is assembled to the blade cushioning member 4, the portion 4d of the blade cushioning member 4 is inscribed inside an arm portion 5a of the blade contact member 5 and the portion 4e of the blade cushioning member 4 is inscribed inside an arm portion 5b of the blade contact member 5.

When the blade contact member 5 is assembled to the blade cushioning member 4 in the above-described manner, the portion 4a is located close to a bending portion of the arm portion 5a and the portion 4b is located close to a bending portion of the arm portion 5b. In the example illustrated in FIG. 16A, the arm portions 5a and 5b are bent by an angle of 90° or less. Accordingly, with the effect of the lowered portion 4a, the arm portion 5a can easily follow the change of shape of the blade cushioning member 4 towards the portion 4d. Similarly, with the effect of the lowered portion 4b, the arm portion 5b can easily follow the change of shape of the blade cushioning member 4 towards the portion 4e.

In addition, With the above-described configuration, even if the finished dimensions of the portions 4d and 4e are set greater than the dimensions of the arm portions 5a and 5b, neither the arm portion 5a nor the arm portion 5b may separate from the portions 4d and 4e. A notch 5e is formed between portions 5c and 5d of the blade contact member 5. Accordingly, the elastic deformation of the portions 5c and 5d may not be prevented even if an impact is applied to the portions 5c and 5d.

The portion 4c is a chamfer of the blade cushioning member 4. Accordingly, the blade cushioning member 4 has the shape with which the rotation direction and the correct orientation of the blade cushioning member 4 in relation to the shaft portion 1h can be verified at a glance.

If the first blade 41 and the second blade 42 collide with the arm portion 5a of the blade contact member 5, the arm portion 5a is elastically deformed with being pivoted around the bending portion, while the portion 4d of the blade cushioning member 4 is compression-deformed. Similarly, if the first blade 41 and the second blade 42 collide with the arm portion 5b of the blade contact member 5, each of the arm portion 5a and the portion 4d is deformed in the above-described manner.

On the other hand, if the first blade 41 and the second blade 42 collide with the portion 5c of the blade contact member 5, the portion 5c is elastically deformed with being pivoted around a boundary between the portions 5c and 5f, while the portion 4g of the blade cushioning member 4 is compression-deformed. Accordingly, the blade contact member 5 can be deformed independently from the deformation of the blade cushioning member 4.

FIGS. 17A through 17D illustrate an exemplary method for assembling the blade cushioning member 4 to the shaft portion 1h.

Figure 17A:
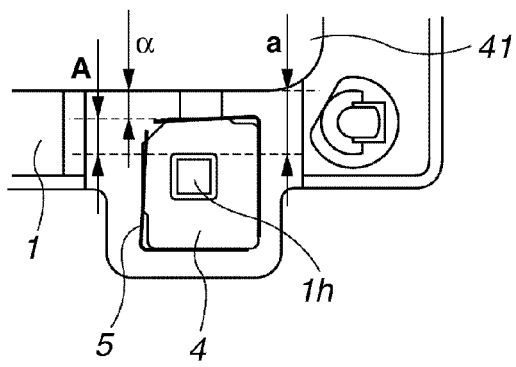
FIGS. 17A through 17D illustrate a method for assembling the blade cushioning member to a shaft portion.
Figure 17B:
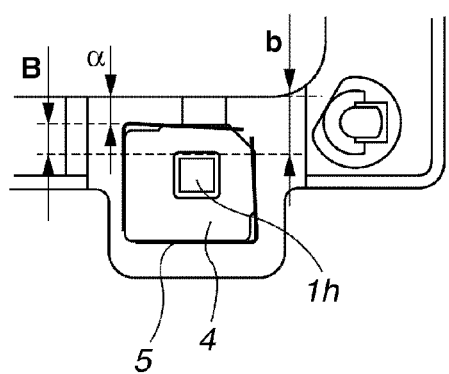
Figure 17C:
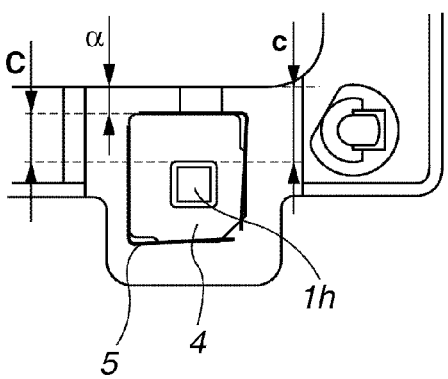
Figure 17D:
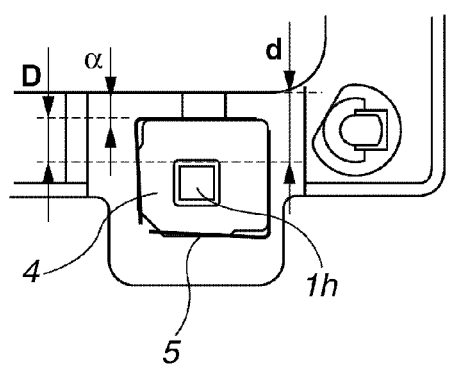

FIG. 17A is a magnified view of the portions of the blade cushioning member 4 when the shutter unit 100 is in the unset state illustrated in FIGS. 10A through 10D. FIGS. 17B through 17D illustrate exemplary orientations of assembling the blade cushioning member 4 to the shaft portion 1h differently from the example illustrated in FIG. 17A.

Referring to FIGS. 17A through 17D, when the orientation of assembling the blade cushioning member 4 by fitting the shaft portion 1h of the shutter base plate 1 into the hole 4h of the blade cushioning member 4 is changed, the distance between the shaft portion 1h to the surface of the blade cushioning member 4 on which an impact from the first blade 41 and the second blade 42 is applied is changed. Dimensions A through D illustrated in FIGS. 17A through 17D have a relationship of descending degree of dimension that can be expressed as B<A<D<C.

Due to any manufacturing dispersion or errors of parts, the distance between the shaft portion 1h and the positions of tips of the first blade 41 and the second blade 42 may vary at a distance a, b, c, or d as illustrated in FIGS. 17A through 17D. However, a clearance α between the blade cushioning member 4 and the shutter blade can be restricted within a predetermined range by changing the orientation of mounting the blade cushioning member 4 to the shaft portion 1h. Accordingly, the clearance between the first blade 41 and the second blade 42 and the blade contact member 5 can be adjusted without providing any clearance adjustment part.

As described above, in the present exemplary embodiment, the distance from the shaft portion 1h to the surface on which an impact is applied from the first blade 41 and the second blade 42 of the blade cushioning member 4 can be adjusted at four stages. If the distance from the shaft portion 1h to the surface on which an impact is applied from the first blade 41 and the second blade 42 of the blade cushioning member 4 is to be adjusted at five or six stages, the blade cushioning member 4 and the blade contact member 5 can be given a polygonal shape, such as a pentagonal shape or a hexagonal shape.

However, if the blade cushioning member 4 and the blade contact member 5 are given the above-described polygonal shape, the dimension of one edge may become small. As a result, the area of the blade cushioning member 4 and the blade contact member 5 large enough to receive an impact from the first blade 41 and the second blade 42 without being damaged cannot be secured. Furthermore, if the size of the blade cushioning member 4 and the blade contact member 5 is increased, the sufficiently large area of the blade cushioning member 4 and the blade contact member 5 may be secured, but this may be neither practical nor useful.

Accordingly, in a modification of the present exemplary embodiment, the blade cushioning member 4 and the blade contact member 5 are combined together in a two-layer configuration. With the above-described configuration, in the modification of the present exemplary embodiment, the distance between the shaft portion 1h and the above-described impact receiving surface can be adjusted at eight stages.

Figure 18A:
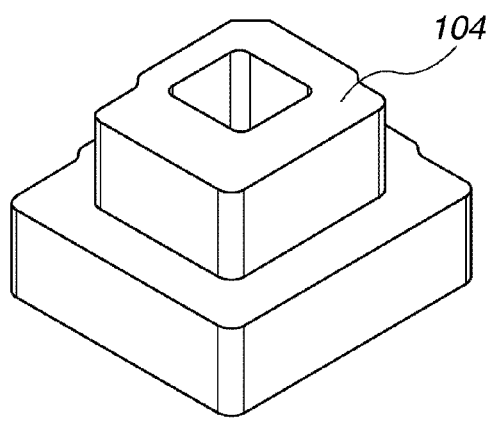
FIGS. 18A through 18C are perspective views illustrating a state in which a first blade contact member and a second blade contact member are assembled to the blade cushioning member.
Figure 18B:
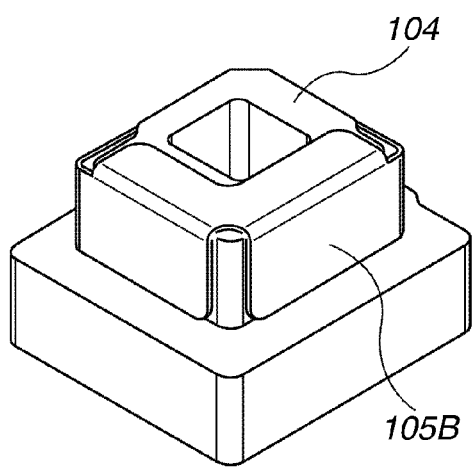
Figure 18C:
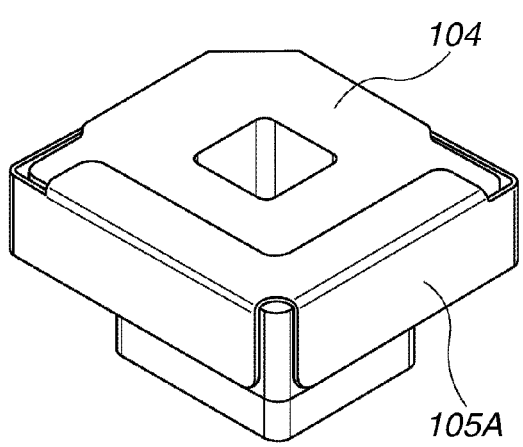

FIGS. 18A through 18C are perspective views illustrating states in which blade contact members 105A and 105B are assembled to a blade cushioning member 104. FIG. 18A illustrates an exemplary shape of the blade cushioning member 104 before the blade contact members 105A and 105B are assembled thereto. FIG. 18B is a perspective view illustrating a state in which the blade contact member 105B is assembled to the blade cushioning member 104. FIG. 18C is a perspective view illustrating a state in which the blade contact member 105A is assembled to the blade cushioning member 104.

Referring to FIG. 18A, the shape of the blade cushioning member 104 is formed by two blade cushioning members 4 having different dimensions mounted together. Referring to FIG. 18B, the blade contact member 105B is assembled to the blade cushioning member 104 in a small portion thereof. The blade contact member 105B has the same shape as the blade contact member 5.

Referring to FIG. 18C, the blade contact member 105A is assembled to the blade cushioning member 104 in a large portion thereof. The blade contact member 105A has the same shape as the blade contact member 5.

Figure 19A:
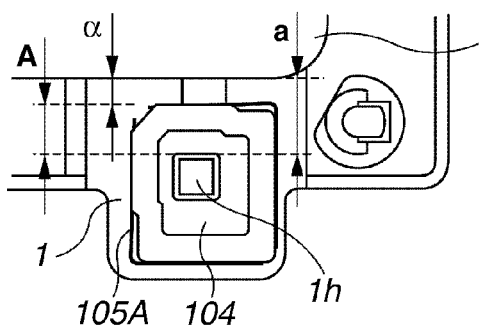
FIGS. 19A through 19H illustrate an exemplary method for assembling the blade cushioning member to the shaft member.
Figure 19B:
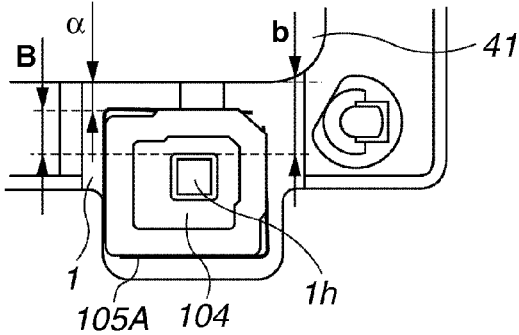
Figure 19C:
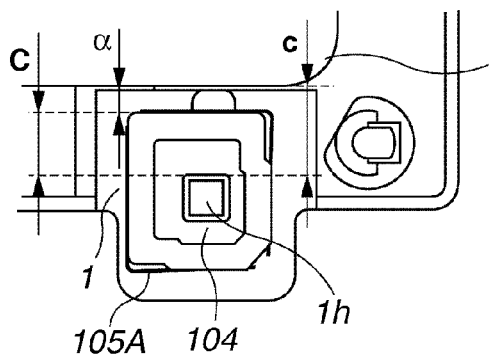
Figure 19D:
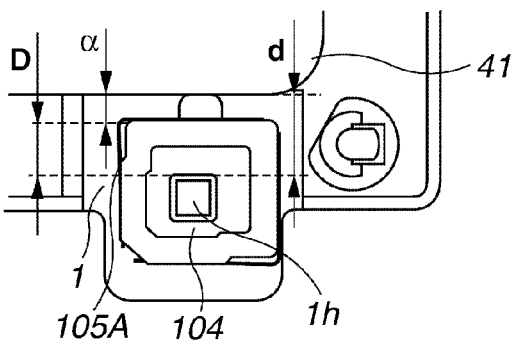
Figure 19E:
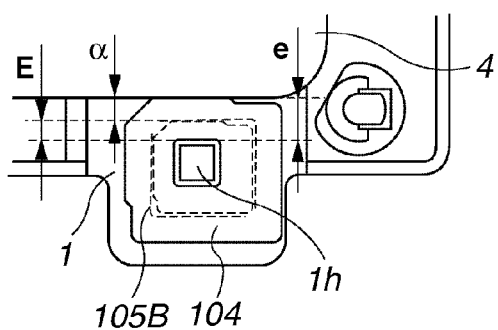
Figure 19F:
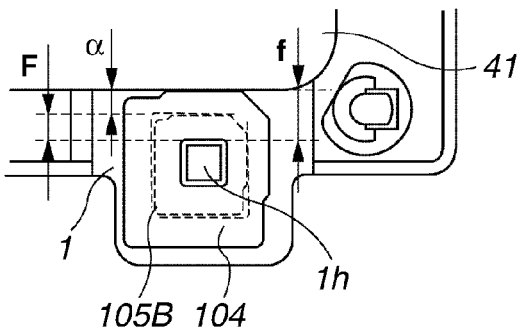
Figure 19G:
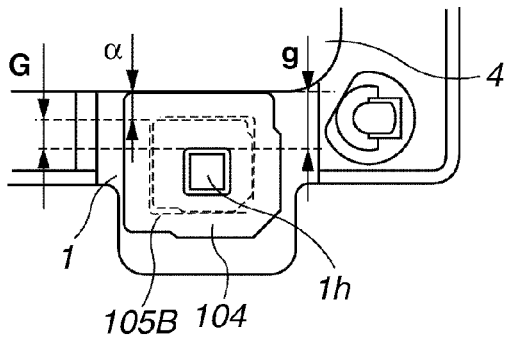
Figure 19H:
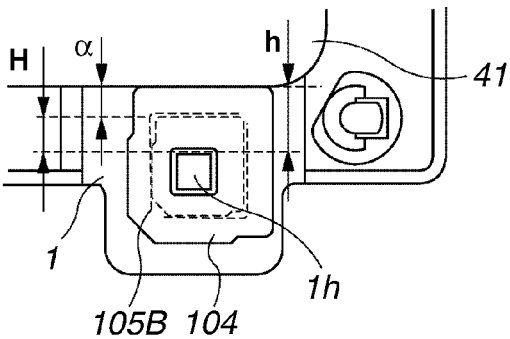

FIGS. 19A through 19H illustrate an exemplary method for assembling the blade cushioning member 104 to the shaft portion 1h. FIG. 19A is a magnified view of the portions of the blade cushioning member 4 when the shutter unit 100 is in the unset state illustrated in FIGS. 10A through 10D. FIGS. 19B through 19h illustrate exemplary orientations of assembling the blade cushioning member 4 to the shaft portion 1h differently from the example illustrated in FIG. 19A.

Referring to FIGS. 19A through 19H, when the orientation of assembling the blade cushioning member 104 by fitting the shaft portion 1h of the shutter base plate 1 on the blade cushioning member 104 is changed, the distance between the shaft portion 1h and the surface of the blade cushioning member 104 on which an impact from the first blade 41 and the second blade 42 is applied is changed. A hole into which the shaft portion 1h of the blade cushioning member 104 is inserted is given to the blade cushioning member 104 at a decentered position of the blade cushioning member 104.

Due to any manufacturing dispersion or errors of parts, the distance between the shaft portion 1h and the positions of tips of the first blade 41 and the second blade 42 may vary among distances a through h as illustrated in FIGS. 19A through 19H. However, a clearance a between the blade cushioning member 104 and the shutter blade can be restricted within a predetermined range by changing the orientation of mounting the blade cushioning member 104 to the shaft portion 1h. Accordingly, the clearance between the first blade 41 and the second blade 42 and the blade contact member 105A or 105B can be adjusted without providing any clearance adjustment part.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2010-261599 filed Nov. 24, 2010 and No. 2010-261601 filed Nov. 24, 2010, which are hereby incorporated by reference herein in their entirety.

What is claimed is:

1. A shutter device comprising:
   a shutter base plate which has an aperture;
   a shutter blade configured to close and open the aperture;
   a blade lever connected with the shutter blade;
   a blade return spring configured to urge the blade lever in a direction in which the aperture is opened by the shutter blade;
   a drive lever configured to press the blade lever in a direction in which the aperture is closed by the shutter blade;
   a blade drive spring configured to urge the drive lever in a direction in which the aperture is closed by the shutter blade;
   an armature which is arranged on the drive lever;
   a yoke configured to attract the armature when energized by an attractive force;
   a first member configured to hold the blade lever to cause the shutter blade to maintain a state of closing the aperture; and
   a second member configured to charge the blade drive spring by moving the drive lever,
   wherein in case when the second member makes the drive lever move to an overcharged position beyond an attraction position where the armature is attracted by the yoke and the second member contacts the drive lever, the blade drive spring is overcharged,
   wherein in a case when the blade drive spring is overcharged, the blade lever does not contact the drive lever even if the blade lever is driven by an urging force of the blade return spring, and
   wherein in a case when contact between the second member and the drive lever is released and the drive lever moves to the attraction position from the overcharged position, the blade lever contacts the drive lever before the yoke starts attracting the armature.

2. The shutter device according to claim 1, further comprising a blade cushioning member configured to absorb an impact generated by a collision by the shutter blade when driving of the blade lever with an urging force of the blade return spring;
   wherein in a case when the shutter blade collides with the blade cushioning member, the blade lever does not contact the drive lever, and
   wherein in a case when the yoke starts attracting the armature, the shutter blade separates from the blade from the blade cushioning member.

3. An imaging apparatus comprising:
   an image sensor; and
   the shutter device according to claim 1 configured to adjust an amount of exposure on the image sensor.

4. The shutter device according to claim 1,
wherein a shaft portion is provided on the shutter base plate,
wherein the blade cushioning member has a hole portion into which the shaft portion is inserted, and
wherein a distance from the shaft portion to a surface of the blade cushioning member to which the impact from the shutter blade is applied, is changed by changing an orientation of assembling the blade cushioning member to the shaft portion.

5. The shutter device according to claim 4,
wherein the blade cushioning member has an outer shape of a polygon,
wherein the shaft portion has the same polygonal shape as the blade cushioning member, and
wherein, when the blade cushioning member is assembled to the shutter base plate, sides of the outer shape of the blade cushioning member and sides of the shaft portion are substantially parallel to one another.

6. The shutter device according to claim 4, further comprising a blade contact member provided between the shutter blade and the blade cushioning member and capable of deforming independently from the blade cushioning member regardless of the orientation of assembling the blade cushioning member.

7. The shutter device according to claim 6, wherein the blade contact member is made from a material having a wear resistance greater than a wear resistance of the blade cushioning member.

\* \* \* \* \*